United States Patent
Yokote et al.

(10) Patent No.: US 10,644,363 B2
(45) Date of Patent: May 5, 2020

(54) TEMPERATURE CONDITIONING UNIT, TEMPERATURE CONDITIONING SYSTEM, AND VEHICLE

(71) Applicant: Panasonic Intellectual Property Management Co., Ltd., Osaka (JP)

(72) Inventors: Shizuka Yokote, Osaka (JP); Takashi Ogawa, Osaka (JP); Michihiro Kurokawa, Osaka (JP); Masahito Hidaka, Osaka (JP); Koji Kuyama, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 90 days.

(21) Appl. No.: 15/565,694

(22) PCT Filed: Sep. 7, 2016

(86) PCT No.: PCT/JP2016/004066
§ 371 (c)(1),
(2) Date: Oct. 11, 2017

(87) PCT Pub. No.: WO2017/047046
PCT Pub. Date: Mar. 23, 2017

(65) Prior Publication Data
US 2018/0083326 A1 Mar. 22, 2018

(30) Foreign Application Priority Data
Sep. 14, 2015 (JP) .................. 2015-180252

(51) Int. Cl.
*B60H 1/00* (2006.01)
*H01M 10/613* (2014.01)
(Continued)

(52) U.S. Cl.
CPC ............ *H01M 10/613* (2015.04); *B60K 1/04* (2013.01); *B60L 58/26* (2019.02); *B60L 58/27* (2019.02);
(Continued)

(58) Field of Classification Search
CPC ......... H01M 10/6556; H01M 10/6563; H01M 10/6566; H01M 10/613; H01M 2/1077;
(Continued)

(56) References Cited

U.S. PATENT DOCUMENTS 4,147,470 A * 4/1979 Brooks ................. F04D 29/281
416/188
5,319,270 A * 6/1994 Tanaka .................. H02K 21/16
310/67 R
(Continued)

FOREIGN PATENT DOCUMENTS

JP 10-093274 4/1998
JP 2004-288527 10/2004
(Continued)

OTHER PUBLICATIONS

International Search Report of PCT application No. PCT/JP2016/004066 dated Nov. 29, 2016.

*Primary Examiner* — Claire E Rojohn, III
(74) *Attorney, Agent, or Firm* — McDermott Will & Emery LLP

(57) ABSTRACT

Temperature conditioning unit (10) includes impeller (110), rotary drive source (200), fan case (120), housing (300), intake-side back-end chamber (311a), intake-side front-end chamber (311d), and isolation wall (311). Intake-side back-end chamber (311a) adjoins an object to be temperature-conditioned. Intake-side front-end chamber (311d) is where the air flows in from outside and flows out toward the intake-side back-end chamber. Isolation wall (311) separates intake-side back-end chamber (311a) from intake-side front-end chamber (311d).

26 Claims, 17 Drawing Sheets

(51) Int. Cl.

| | |
|---|---|
| *F04D 29/30* | (2006.01) |
| *H01M 10/625* | (2014.01) |
| *H01M 10/6563* | (2014.01) |
| *H01M 10/6566* | (2014.01) |
| *B60K 1/04* | (2019.01) |
| *B60L 58/27* | (2019.01) |
| *B60L 58/26* | (2019.01) |
| *H01M 2/10* | (2006.01) |
| *H01M 10/6556* | (2014.01) |
| *H01M 10/63* | (2014.01) |
| *F04D 27/00* | (2006.01) |
| *F04D 29/44* | (2006.01) |
| *F04D 29/28* | (2006.01) |
| *B60K 1/00* | (2006.01) |
| *F04D 25/06* | (2006.01) |
| *F04D 29/42* | (2006.01) |

(52) U.S. Cl.
CPC ......... *F04D 27/002* (2013.01); *F04D 27/004* (2013.01); *F04D 29/30* (2013.01); *F04D 29/444* (2013.01); *H01M 2/1077* (2013.01); *H01M 10/625* (2015.04); *H01M 10/63* (2015.04); *H01M 10/6556* (2015.04); *H01M 10/6563* (2015.04); *H01M 10/6566* (2015.04); *B60K 2001/005* (2013.01); *B60K 2001/008* (2013.01); *F04D 25/06* (2013.01); *F04D 29/281* (2013.01); *F04D 29/4226* (2013.01); *Y02T 10/705* (2013.01); *Y02T 10/7005* (2013.01)

(58) Field of Classification Search
CPC ........ H01M 10/63; B60L 58/27; B60L 58/26; F04D 29/281; F04D 29/4226; F04D 25/06
USPC .......................................................... 165/41
See application file for complete search history.

(56) References Cited

U.S. PATENT DOCUMENTS

| | | | | |
|---|---|---|---|---|
| 6,008,559 | A * | 12/1999 | Asano | H02K 1/2766 310/156.53 |
| 6,217,285 | B1 * | 4/2001 | Kurokawa | F04D 29/282 416/186 R |
| 6,940,205 | B1 * | 9/2005 | Murakami | H02K 1/278 310/156.01 |
| 7,794,206 | B2 * | 9/2010 | Keber | F04D 29/023 416/186 R |
| 8,500,150 | B2 * | 8/2013 | Cho | B62M 6/90 280/212 |
| 8,512,887 | B2 * | 8/2013 | Reyburn | H01M 10/425 429/89 |
| 8,604,650 | B2 * | 12/2013 | Sadanaga | F04D 25/0606 310/51 |
| D701,300 | S * | 3/2014 | Tanabe | D23/379 |
| 9,147,917 | B2 * | 9/2015 | Oh | H01M 2/1077 |
| 9,261,107 | B2 * | 2/2016 | Kim | F04D 29/30 |
| 9,899,712 | B2 * | 2/2018 | Nagano | H01M 10/613 |
| 10,000,138 | B2 * | 6/2018 | Tanaka | H01M 10/613 |
| 10,118,502 | B2 * | 11/2018 | Yokote | H01M 10/625 |
| 10,161,412 | B2 * | 12/2018 | Kim | F04D 17/16 |
| 10,205,203 | B2 * | 2/2019 | Yao | B60L 58/26 |
| 10,322,627 | B2 * | 6/2019 | Maskew | H01M 10/658 |
| 2001/0031209 | A1 * | 10/2001 | Fujinaka | F04D 25/08 417/354 |
| 2004/0232891 | A1 | 11/2004 | Kimoto et al. | |
| 2006/0078786 | A1 * | 4/2006 | Wu | H01M 2/1022 429/62 |
| 2006/0162901 | A1 * | 7/2006 | Aizono | G06F 1/203 165/80.4 |
| 2007/0116576 | A1 * | 5/2007 | Chang | F04D 29/281 416/228 |
| 2007/0251680 | A1 * | 11/2007 | Kinoshita | F04D 29/282 165/145 |
| 2009/0205154 | A1 * | 8/2009 | Yokote | F04D 25/082 15/300.1 |
| 2009/0253029 | A1 * | 10/2009 | Inoue | H01M 2/0237 429/71 |
| 2009/0256295 | A1 * | 10/2009 | Kodama | H02K 5/163 267/141 |
| 2010/0075206 | A1 * | 3/2010 | Tamura | H01M 2/1077 429/62 |
| 2010/0255360 | A1 * | 10/2010 | Umemoto | H01M 2/24 429/120 |
| 2015/0325891 | A1 * | 11/2015 | Inoue | H01M 10/613 180/68.1 |
| 2019/0173140 | A1 * | 6/2019 | Yokote | B60H 1/2225 |

FOREIGN PATENT DOCUMENTS

| | | |
|---|---|---|
| JP | 2010-080134 | 4/2010 |
| JP | 2015-216013 | 12/2015 |

* cited by examiner

FORWARD-CURVED FAN

BACKWARD-CURVED FAN

TEMPERATURE CONDITIONING UNIT, TEMPERATURE CONDITIONING SYSTEM, AND VEHICLE

TECHNICAL FIELD

The present invention relates to a temperature conditioning unit and a temperature conditioning system that temperature-condition an object to be temperature-conditioned and also relates to a vehicle equipped with the temperature conditioning unit or the temperature conditioning system. The present invention relates more particularly to a temperature conditioning unit, a temperature conditioning system or the like that temperature-conditions a power storage device or an inverter device that is mounted to a vehicle such as an electric vehicle or a hybrid vehicle.

BACKGROUND ART

In a vehicle that is mounted with a plurality of power sources including a secondary battery, such as a hybrid vehicle, secondary battery cells produce heat because of current passing through the battery during charge and discharge, internal resistance of the battery cells, and contact resistance of cell connectors. Temperature of the secondary battery greatly affects a life of the secondary battery. Blowing air of ordinary temperature or the like for cooling the battery cells or warming the battery cells under extremely low temperature conditions is very important in improving output of a battery system and reducing a number of cells.

However, securing internal space of the vehicle sets a limit to securement of a sufficiently ample mounting area for the secondary battery, so that the plurality of battery cells is arranged inside a housing of limited size. Air-blowing using a forced air-cooling means for air-cooling is generally carried out to temperature-condition the secondary battery which is an object to be temperature-conditioned. It is a matter of course that increase in output density of the battery demands increase in output of a device such as a temperature conditioning unit and a temperature conditioning system. The increase in the device's output tends to cause increase in size of the device. On the other hand, there is a demand for size reduction of the device. Thus, it goes without saying that seeking the increase in the device's output and the size reduction of the device at the same time is a highly difficult subject.

A centrifugal blower that uses a scroll casing, such as shown in PTL 1 or PTL 2, is often used in a conventional cooling device for a vehicle-mounted secondary battery. In the centrifugal blower using the scroll casing, a casing exit requires a measurable straight passage. Accordingly, a distance from a housing to the blower increases, so that an ample mounting area is required. Moreover, a flow discharged from an impeller (centrifugal fan) is drawn outward along a scroll side wall. For this reason, a flow uniforming mechanism such as a flow dividing duct is required to uniform temperature distribution inside the housing. These points are problematic when further size reduction is sought.

FIG. 18 is a sectional view illustrating a temperature conditioning unit of a comparative example. Object 350 to be temperature-conditioned is accommodated by housing 310 of the temperature conditioning unit of the comparative example shown in FIG. 18. Air discharged from forward-curved fan 400 is integrated circumferentially inside scroll casing 1120. Scroll casing 1120 is such that a distance from rotating shaft 1112a to side wall 1121 gradually increases. Thus, flow 301 of the air discharged from forward-curved fan 400 is drawn toward inner-circumferential surface 1121a of side wall 1121. Accordingly, flow uniforming mechanism 1310 such as duct 1311 needs to be mounted inside housing 310 to uniform air flow 301 that is fed into housing 310.

However, centrifugal blower 1100 using forward-curved fan 400 causes long distance L from its center of gravity G to discharge hole 1123. Temperature conditioning unit 1010 thus becomes badly balanced and unstable when this centrifugal blower 1100 is mounted to housing 310. Accordingly, temperature conditioning unit 1010 is fixed to a peripheral member via mounting parts 1124. In this case, a variety of shape variations are required of mounting parts 1124 for adaptation of temperature conditioning unit 1010 to an environment where temperature conditioning unit 1010 is used.

Especially in cases where flow uniforming mechanism 1310 is formed separately from housing 310, a distance from center of gravity G to flow uniforming mechanism 1310 needs to be considered. Generally, the distance from center of gravity G to flow uniforming mechanism 1310 becomes long, so that the temperature conditioning unit becomes more badly balanced.

In a conventional method, a blower mechanism is disposed near a heat generator when air is blown against object 350 to be temperature-conditioned (refer to, for example, PTL 3). However, in an electric apparatus in which an object to be temperature-conditioned is large with respect to a housing with a plurality of heat generators being densely disposed, air flow resistance, that is to say, pressure loss increases.

In a conventional temperature conditioning unit, a housing has high ventilation resistance, so that high output is required of a blower mechanism, thus naturally causing increase in size of the blower mechanism. Consequently, the blower mechanism is difficult to accommodate in the housing. As such, a blower mechanism is generally placed externally to a housing, and a passage is formed by a duct or the like that connects a discharge hole of a blower and an inflow port of the housing (refer to, for example, PTL 1). For this reason, it is difficult to achieve size reduction of the electric apparatus including the object to be temperature-conditioned and a temperature conditioning system.

PATENT LITERATURES

PTL 1: Unexamined Japanese Patent Publication No. 2004-288527

PTL 2: Unexamined Japanese Patent Publication No. 2010-080134

PTL 3: Unexamined Japanese Patent Publication No. H10-093274

SUMMARY OF THE INVENTION

To solve the above problems, a temperature conditioning unit according to the present invention includes an impeller, a rotary drive source, a fan case, a housing, an intake-side back-end chamber, an intake-side front-end chamber, and an isolation wall. The impeller has an impeller disk that is substantially disk-shaped, includes a rotating shaft in its center and is disposed on a plane perpendicular to the rotating shaft, and a plurality of rotor vanes erected on an intake-hole-end surface of the impeller disk. The rotary drive source includes a shaft and is connected to the impeller via the shaft. The fan case has a side wall that is substantially cylindrical and is formed to be centered about the rotating shaft, an intake hole that is circular on a plane perpendicular to the rotating shaft and is centered about the rotating shaft, and a discharge hole positioned on an opposite end of the side wall from the intake hole in a direction along the rotating shaft. The housing includes an outer surface mounted with the fan case and accommodates an object to be temperature-conditioned. The intake-side back-end chamber adjoins the object to be temperature-conditioned. The intake-side front-end chamber is where the air flows in from outside and flows out toward the intake-side back-end chamber. The isolation wall separates the intake-side back-end chamber from the intake-side front-end chamber.

According to the present invention described above, the temperature conditioning unit that can be provided is of a simple and small-size structure and is capable of efficient air-blowing even with respect to the housing containing densely disposed components.

DESCRIPTION OF EMBODIMENTS

Figure 1A:
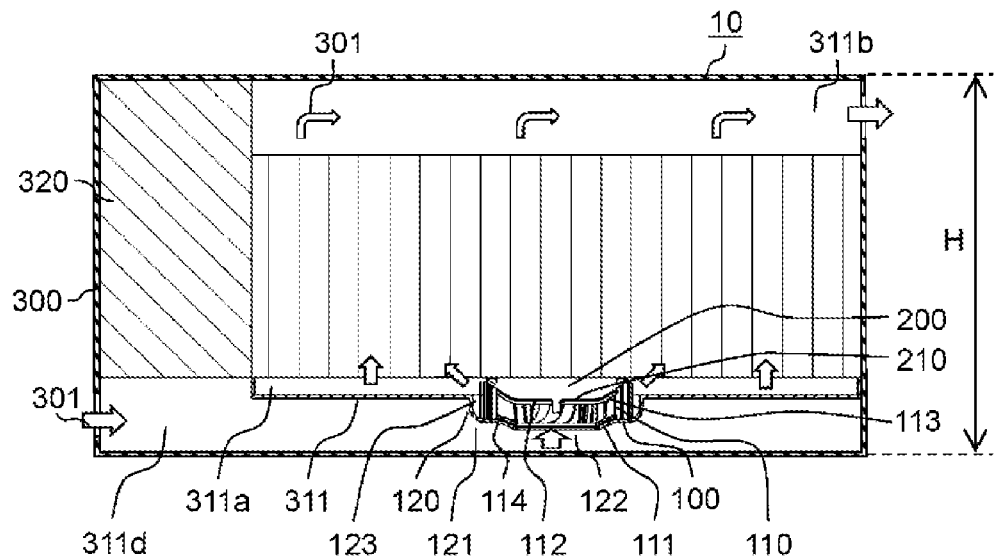
FIG. 1A is a sectional view of a temperature conditioning unit according to a first exemplary embodiment of the present invention.

The present invention is described hereinafter with reference to the accompanying drawings. It is to be noted that the following exemplary embodiments are not restrictive of the present invention, and representation of the drawings is not restrictive of top and bottom in actual installation. A flow of air (air flow) that is discharged from blower 100 is described below as a discharged flow. It is to be noted that outlined arrows in the drawings are displayed to schematically indicate aspects of a flow of air (air flow) and the discharged flow.

First Exemplary Embodiment

Figure 1B:
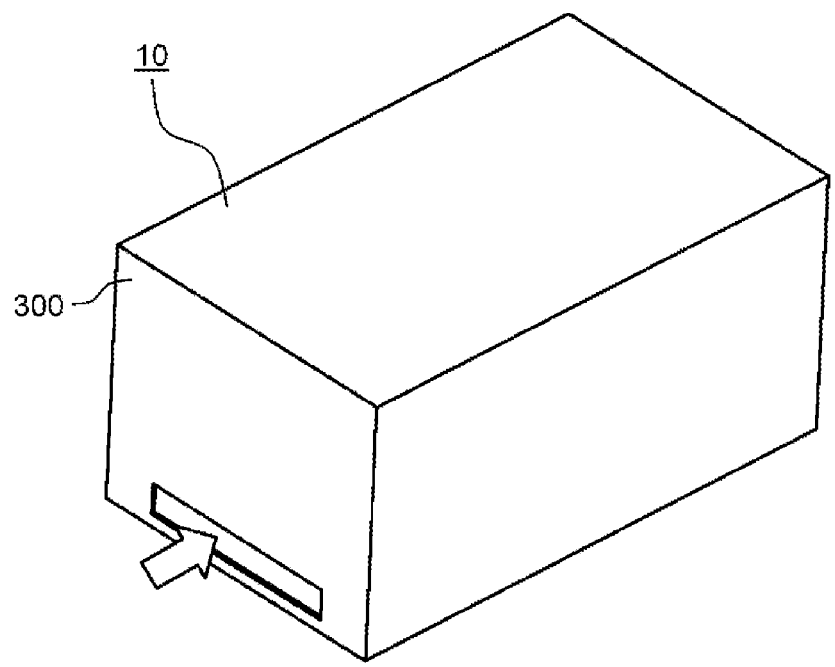
FIG. 1B is a perspective view of the temperature conditioning unit according to the first exemplary embodiment of the present invention.
Figure 1C:
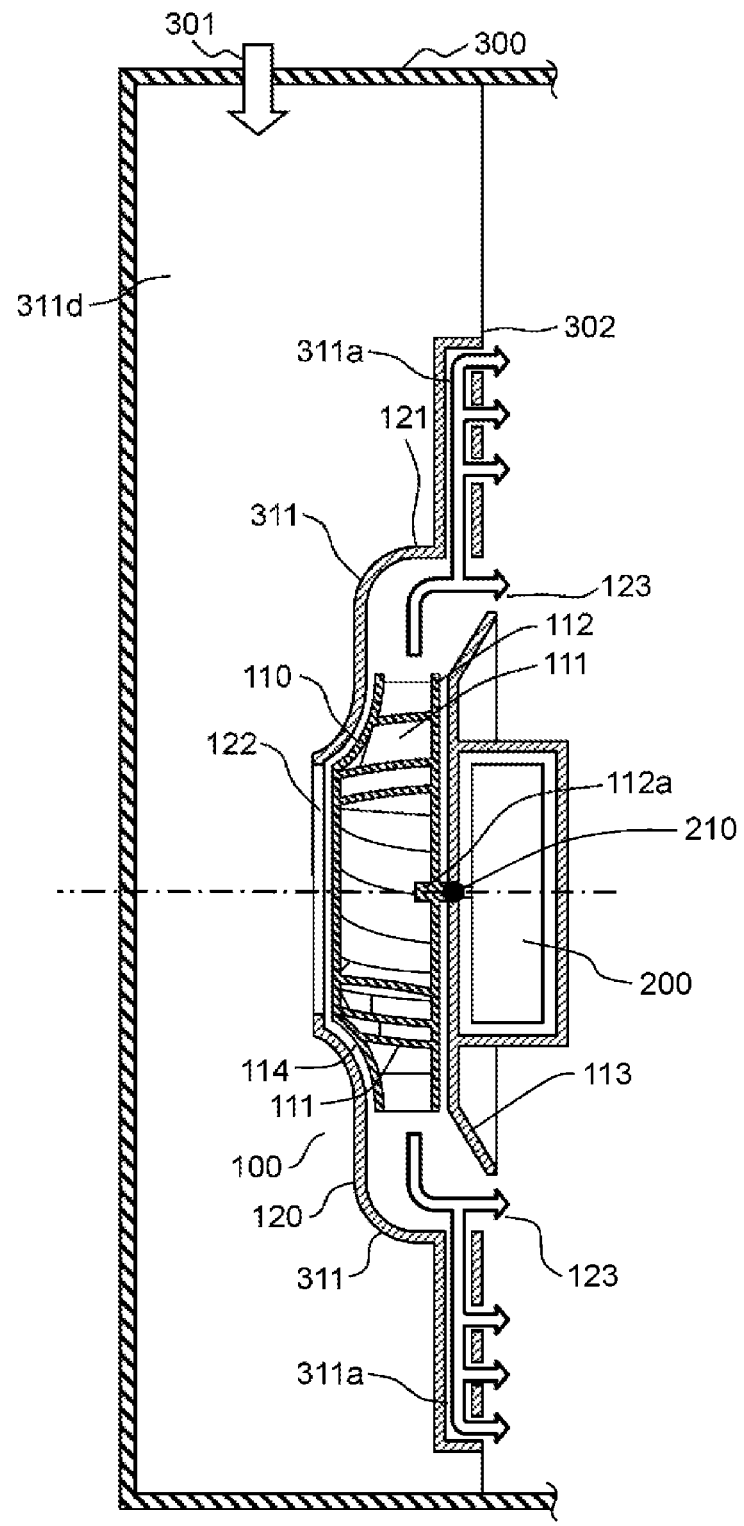
FIG. 1C is an enlarged view illustrating an essential portion of one example of the temperature conditioning unit shown in FIG. 1A.
Figure 2:
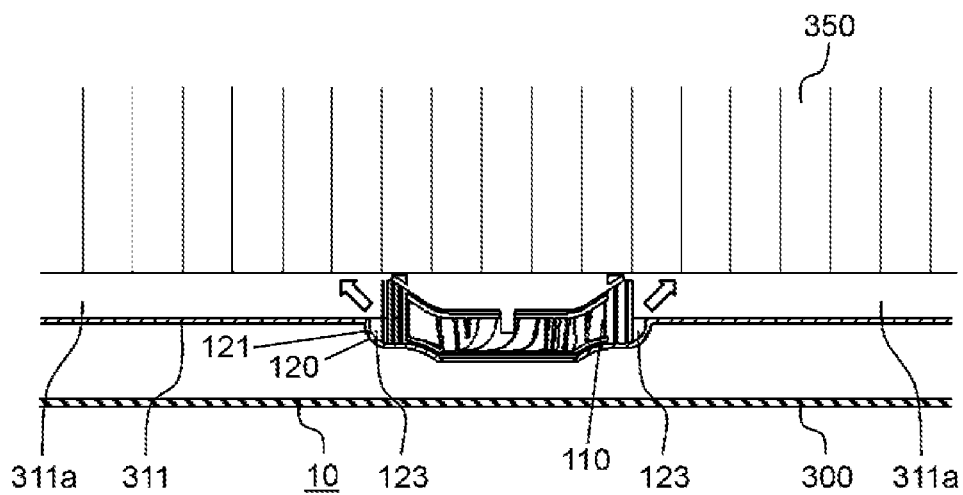
FIG. 2 is a sectional view illustrating another structure of the temperature conditioning unit according to the first exemplary embodiment of the present invention.
Figure 3:
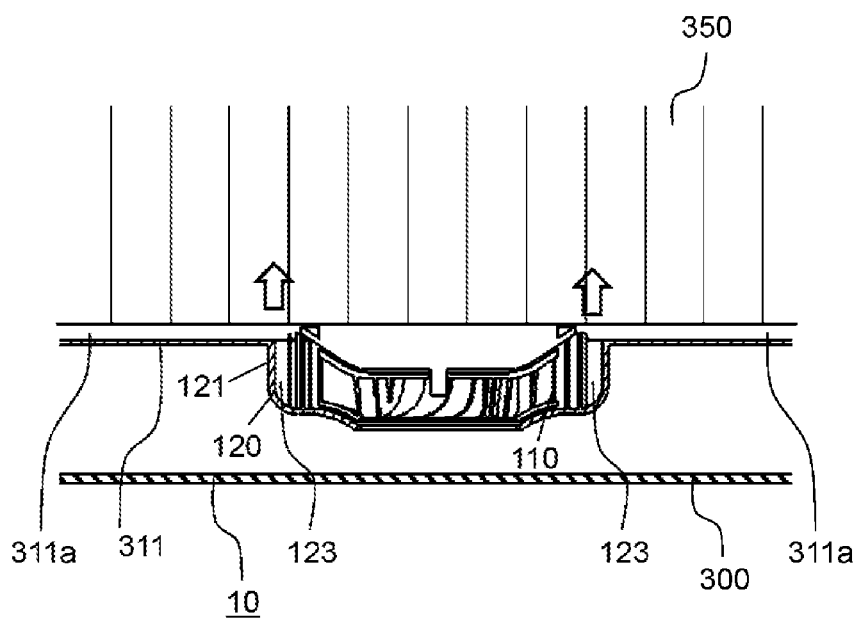
FIG. 3 is a sectional view illustrating still another structure of the temperature conditioning unit according to the first exemplary embodiment of the present invention.

FIG. 1A is a sectional view of temperature conditioning unit 10 according to a first exemplary embodiment of the present invention. FIG. 1B is a perspective view of temperature conditioning unit 10. FIG. 1C is an enlarged view illustrating an essential portion of one example of the temperature conditioning unit shown in FIG. 1A. FIG. 2 is a sectional view illustrating another structural example of temperature conditioning unit 10 according to the first exemplary embodiment of the present invention. FIG. 3 is a sectional view illustrating still another structure of the temperature conditioning unit according to the first exemplary embodiment of the present invention. Temperature conditioning unit 10 is sheathed with housing 300. Housing 300 includes outer surface 302 that is mounted with fan case 120. Housing 300 accommodates constituent elements that are described below. Blower 100 is a centrifugal blower element and includes impeller (centrifugal fan) 110 including a plurality of rotor vanes 111 and substantially disk-shaped impeller disk 112 connecting rotor vanes 111, and fan case 120 that has substantially cylindrical side wall 121 formed to be centered about a rotating shaft of impeller 110 and intake hole 122 that is circular on a plane perpendicular to the rotating shaft and is centered about the rotating shaft. Impeller 110 is fixedly connected via shaft 210 to electric motor 200 that is a rotary drive source. Electric motor 200 used as the rotary drive source includes shaft 210.

As electric motor 200 used as the rotary drive source is rotationally driven, impeller 110 rotates, whereby air that flows from intake hole 122 of fan case 120 and is energized by rotor vanes 111 is discharged in a direction substantially perpendicular to the rotating shaft. Side wall 121 of fan case 120 that defines a first airflow guide shape changes the direction of a discharged flow to a counter intake direction with respect to the rotating shaft. It is to be noted that an inner wall of side wall 121 is preferably shaped into a gently curved surface so as not to obstruct the air flow. The air flow discharged from discharge hole 123 of fan case 120 is communicated to intake-side back-end chamber 311a adjoining object 350 to be temperature-conditioned. The air accumulating in intake-side back-end chamber 311a is fed to object 350 to be temperature-conditioned in a substantially uniform manner, thus cooling or warming a component such as a battery pack. There are cases where electronic device part 320 that controls object 350 to be temperature-conditioned is contained in a space shared with object 350 to be temperature-conditioned. A region that an intake part of blower 100 faces is separated from intake-side back-end chamber 311a. Isolation wall 311 may be formed separately from fan case 120 and be mounted so as to prevent a leakage flow between fan case 120 and isolation wall 311 or may be formed integrally with fan case 120.

Impeller 110 includes substantially disk-shaped impeller disk 112 that includes, in its center, rotating shaft 112a of electric motor 200 used as the rotary drive source and is disposed on a plane perpendicular to rotating shaft 112a, and the plurality of rotor vanes 111 erected on an intake-hole-end surface of impeller disk 112. Impeller 110 includes shroud 114. An aspect of shroud 114 is that shroud 114 is an annular plate provided at the intake hole to cover respective edges of rotor vanes 111 of impeller 110.

Shroud 114 is funnel-shaped, bell-shaped, or trumpet-shaped, having a hole in its center. A wider mouth of shroud 114 faces impeller disk 112, while a narrower mouth of shroud 114 faces the intake hole. Impeller disk 112 includes, along its outer-peripheral end, slope 113 that inclines toward an air supply direction, thereby reducing resistance to the air flow. In the present exemplary embodiment, shroud 114 has such a shape to prioritize blower efficiency. However, a planar shroud is sufficiently effective, and even when the shroud is omitted for simplification of a manufacturing process, the blower performs its function.

In a conventional method, a blower mechanism is disposed near a heat generator when air is blown against an object to be temperature-conditioned. However, in an electric apparatus in which an object to be temperature-conditioned is large with respect to a housing with a plurality of heat generators being densely disposed as in the case of the present exemplary embodiment, air flow resistance, that is to say, pressure loss increases. Accordingly, in cases where the object to be temperature-conditioned occupies a large volume of the housing, there are provided an intake-side front-end chamber in which a flow of fluid accelerates, an intake-side back-end chamber at an inflow surface of the object to be temperature-conditioned, and an exhaust-side chamber at an outflow surface of the object to be temperature-conditioned.

With these chambers, the air is blown against the object to be temperature-conditioned in a substantially uniform manner. The intake-side front-end chamber, the intake-side back-end chamber, and the exhaust-side chamber are often limited to a minimum area each for size reduction of the electric apparatus. On the other hand, the housing has high ventilation resistance, so that high output is required of the blower mechanism, thus naturally causing increase in size of the blower mechanism. Consequently, it is difficult to accommodate the blower mechanism in the housing. As such, the blower mechanism is generally placed externally to the housing, and a passage is formed by a duct or the like that connects a discharge hole of a blower and an inflow port of the housing. For this reason, it is difficult to achieve size reduction of the electric apparatus including the object to be temperature-conditioned and a temperature conditioning system.

On the other hand, temperature conditioning unit 10 of the present exemplary embodiment enables passage of sufficient cooling air even when intake-side front-end chamber 311d, intake-side back-end chamber 311a, and exhaust-side chamber 311b each have an aspect of flat shape, by adopting the centrifugal blower element of high static pressure. Blower 100, which is the centrifugal blower element, may be devoid of exhaust-side chamber 311b. FIG. 1A illustrates an aspect in which blower 100 that is the centrifugal blower element is placed at isolation wall 311 separating intake-side back-end chamber 311a and intake-side front-end chamber 311b. FIG. 1C is an enlarged view of the essential portion of the temperature conditioning unit shown in FIG. 1A. Pressure is lower inside intake-side front-end chamber 311d than atmospheric pressure. Pressure is higher inside intake-side back-end chamber 311a than the atmospheric pressure. Thus, air flow 301 is accelerated heading from intake-side front-end chamber 311d toward intake-side back-end chamber 311a. A directional component (the direction) of the discharged flow from impeller 110 can be varied by choice according to an axial length of the substantially cylindrical shape of side wall 121 of fan case 120 that defines the first airflow guide shape. For example, when side wall 121 of fan case 120 that defines the first airflow guide shape has a shorter axial dimension as shown in FIG. 2, the discharged flow from impeller 110 becomes a flow having an increased radial component and is discharged from discharge hole 123. When side wall 121 of fan case 120 that defines the first airflow guide shape has a longer axial dimension as shown in FIG. 3, the discharged flow from impeller 110 becomes a flow having an increased axial component along a wall surface and is discharged from discharge hole 123. Depending on a radial dimension of blower 100 and build of object 350 to be temperature-conditioned, suitable dimensions and suitable shapes of impeller 110, shroud 114, and a diffuser vary each time and thus are selected through use of a scientific method. It is a matter of course that the suitable dimensions and shapes of impeller 110, shroud 114, and the diffuser are not simple to find univocally.

With an electric apparatus including object 350 to be temperature-conditioned and a blower mechanism thus reduced in size in the above manner, a vehicle, for example, can have increased indoor space when mounted with this electric apparatus. Accordingly, comfortability is improved for passengers.

As described above, temperature conditioning unit 10 according to the present exemplary embodiment includes impeller 110, rotary drive source 200, fan case 120, housing 300, intake-side back-end chamber 311a, intake-side front-end chamber 311d, and isolation wall 311. Impeller 110 has substantially disk-shaped impeller disk 112 that includes rotating shaft 112a in its center and is disposed on the plane perpendicular to rotating shaft 112a, and the plurality of rotor vanes 111 erected on the intake-hole-end surface of impeller disk 112. Rotary drive source 200a includes shaft 210 and is connected to impeller 110 via shaft 210. Fan case 120 has substantially cylindrical side wall 121 formed to be centered about rotating shaft 112a, intake hole 122 that is circular on the plane perpendicular to rotating shaft 112a and is centered about rotating shaft 112a, and discharge hole 123 positioned on an opposite end of side wall 121 from intake hole 122 in a direction along rotating shaft 112a. Housing 300 includes outer surface 302 mounted with fan case 120 and accommodates object 350 to be temperature-conditioned. Intake-side back-end chamber 311a adjoins object 350 to be temperature-conditioned. Intake-side front-end chamber 311d is where the air flows in from outside and flows out toward intake-side back-end chamber 311a. Isolation wall 311 separates intake-side back-end chamber 311a from intake-side front-end chamber 311d.

Thus, temperature conditioning unit 10 that can be provided is of small size and is capable of efficient air-blowing even with respect to housing 300 containing the densely disposed components.

Moreover, impeller 110 includes shroud 114, and shroud 114 may be the annular plate provided at intake hole 122 to cover the respective edges of rotor vanes 111. In this way, resistance to the air flow can be reduced.

The rotary drive source may be electric motor 200.

A stator winding of the rotary drive source may include copper, copper alloy, aluminum, or aluminum alloy.

Impeller 110 may include metal or resin.

Second Exemplary Embodiment

Figure 4:
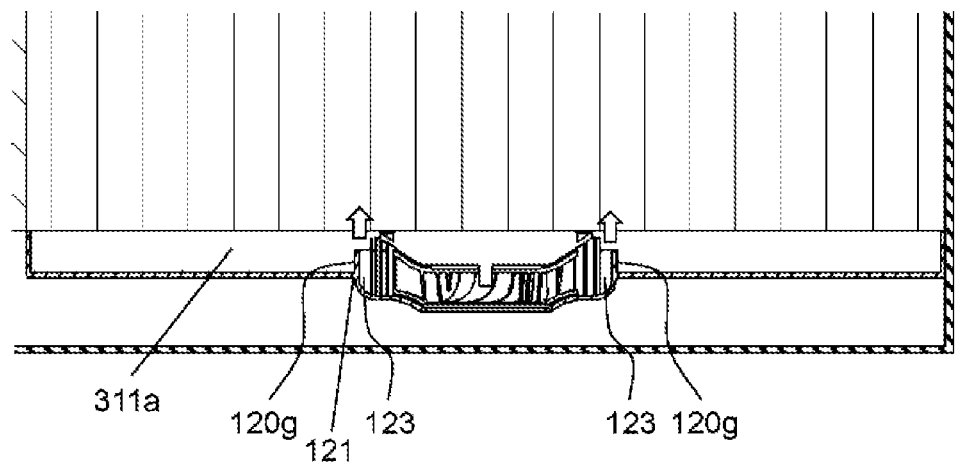
FIG. 4 is a sectional view illustrating a structure of a temperature conditioning unit according to a second exemplary embodiment of the present invention.
Figure 5:
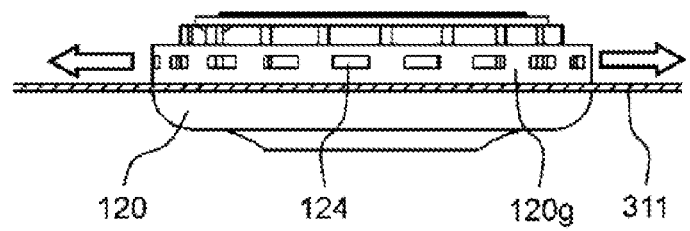
FIG. 5 is a sectional view illustrating another structure of the temperature conditioning unit according to the second exemplary embodiment of the present invention.

FIG. 4 is a sectional view illustrating a structure of a temperature conditioning unit according to a second exemplary embodiment of the present invention. FIG. 5 is a sectional view illustrating another structure of the temperature conditioning unit according to the second exemplary embodiment of the present invention.

As shown in FIG. 4, the temperature conditioning unit includes projecting wall 120g formed as a result of a substantially cylindrical wall, which is side wall 121 of a fan case that defines a first airflow guide shape, projecting into intake-side back-end chamber 311a. In this way, an axial component of a discharged flow from an impeller can be increased without narrowing of an area for the intake-side back-end chamber. In order to increase a radial component of a discharged flow from an impeller with an area ensured for an intake-side back-end chamber, as shown in FIG. 5, projecting wall 120g formed as a result of a cylindrical wall, which is a side wall of a fan case that defines a first airflow guide shape positioned in an intake-side back-end chamber, projecting into the intake-side back-end chamber may be provided with auxiliary holes 124. Depending on a radial dimension of a blower and build of an object to be temperature-conditioned, a shape and dimensions of auxiliary hole 124 vary each time and thus are selected through use of a scientific method. Suitable dimensions and a suitable shape of auxiliary hole 124 are not simple to find univocally.

As described above, in temperature conditioning unit 10 according to the present exemplary embodiment, the first airflow guide shape's substantially cylindrical wall that is parallel to a rotating-shaft direction projects into intake-side back-end chamber 311a. In this way, the axial component of the discharged flow from impeller 110 can be increased without narrowing of the area for the intake-side back-end chamber.

Alternatively, in temperature conditioning unit 10 of the present exemplary embodiment, the first airflow guide shape's substantially cylindrical wall that is parallel to the rotating-shaft direction may extend into intake-side back-end chamber 311a, and a substantially cylindrical shape of the first airflow guide shape may be provided with the holes from which the discharged flow from impeller 110 is released.

Third Exemplary Embodiment

Figure 6:
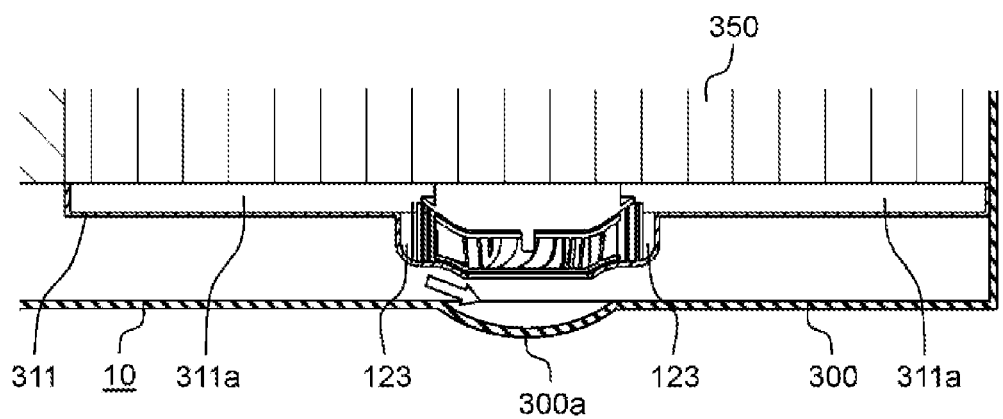
FIG. 6 is a sectional view illustrating a structure of a temperature conditioning unit according to a third exemplary embodiment of the present invention.

There are cases where a sufficient distance cannot be ensured from a suction port of a blower to a wall surface of a housing containing an object to be temperature-conditioned when the blower is placed inside an intake-side back-end chamber that is designed for use in a minimum area for size reduction. When this distance is shorter, a passage area of an inflow part of the blower is partially reduced, whereby inflow loss increases and thus causes decreased efficiency of the blower. FIG. 6 is a sectional view illustrating a structure of a temperature conditioning unit according to a third exemplary embodiment of the present invention. As shown in FIG. 6, the temperature conditioning unit includes housing-part projection 300a formed by protruding a part of housing 300 that faces a suction port of a blower. In this way, a suction passage area can be increased, so that pressure loss can be suppressed with an electric apparatus maintaining substantially the same overall size, and the blower can have improved efficiency.

As described above, temperature conditioning unit 10 according to the present exemplary embodiment includes housing-part projection 300a formed by protruding the part of housing 300 that faces the suction port of blower 100. In this way, the suction passage area can be increased, so that the pressure loss can be suppressed with the electric apparatus maintaining substantially the same overall size, and the blower can have the improved efficiency.

Fourth Exemplary Embodiment

Figure 7A:
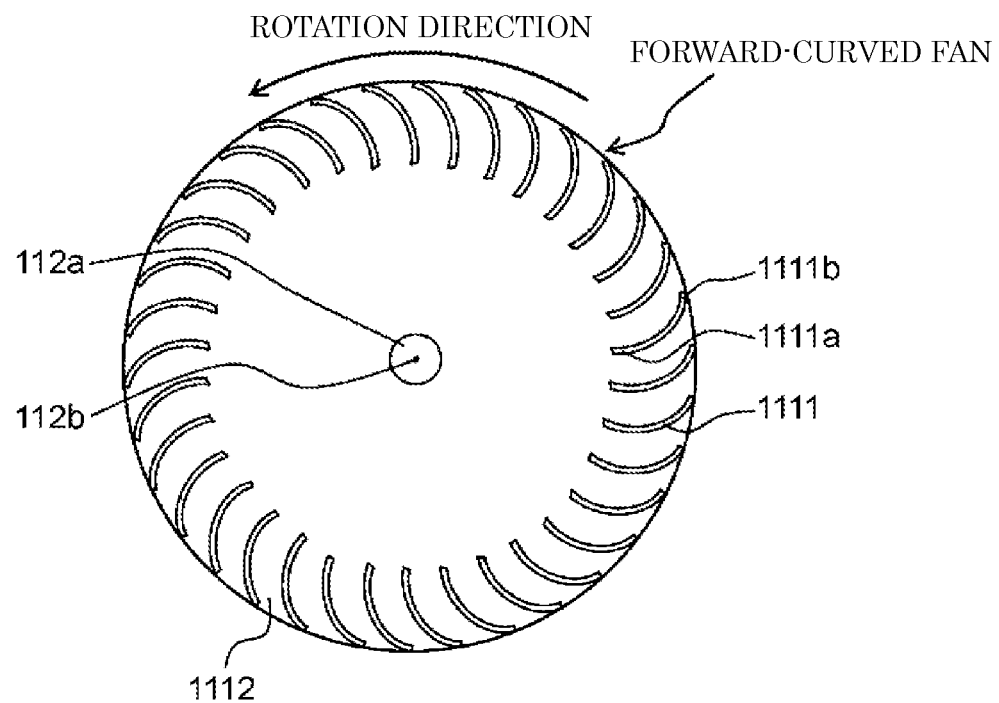
FIG. 7A illustrates rotor vane shapes of an impeller (i.e., vane shapes of a forward-curved fan) that is used in a temperature conditioning unit of a comparative example.
Figure 7B:
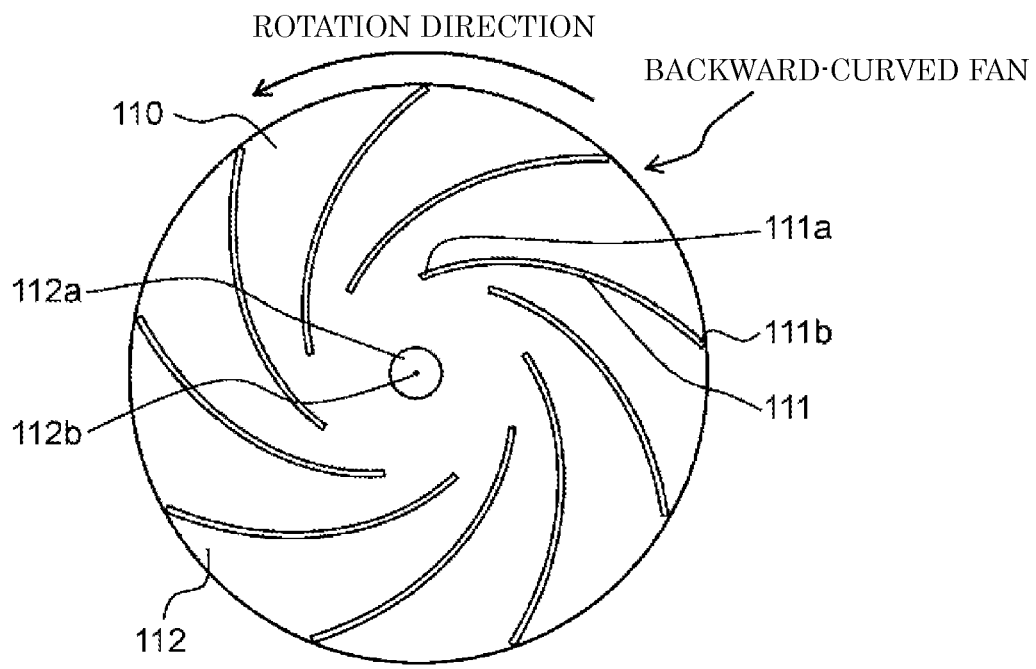
FIG. 7B illustrates rotor vane shapes of an impeller (i.e., vane shapes of a backward-curved fan) that is used in each of the temperature conditioning units of the present invention's exemplary embodiments.
Figure 8A:
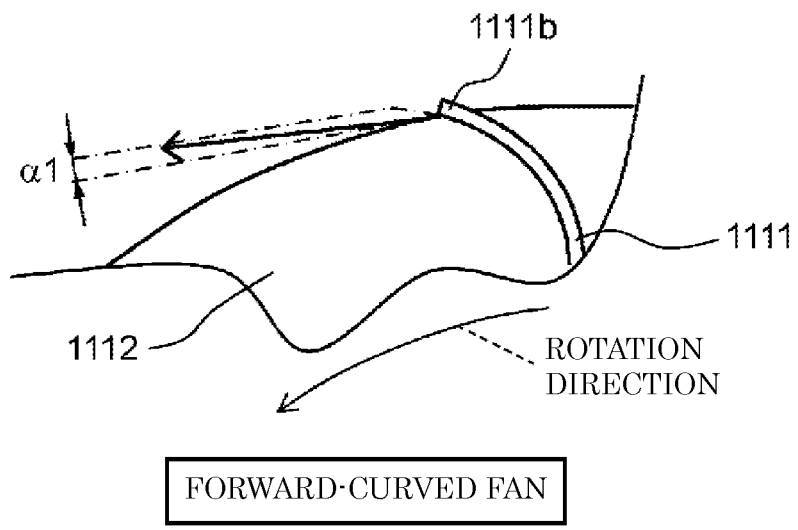
FIG. 8A is an enlarged view of an essential portion of each rotor vane (each of the vane shapes of the forward-curved fan) shown in FIG. 7A, illustrating an absolute outlet angle.
Figure 8B:
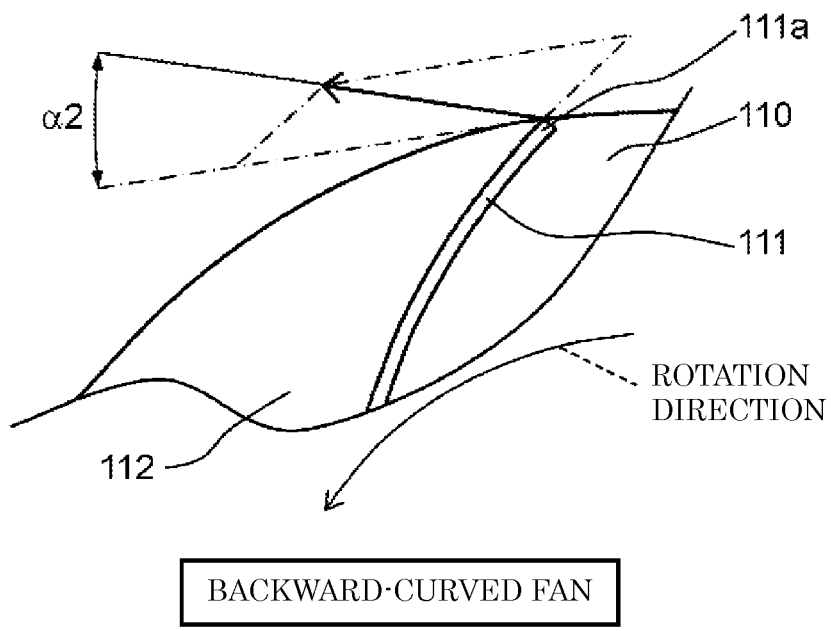
FIG. 8B is an enlarged view of an essential portion of each rotor vane (each of the vane shapes of the backward-curved fan) shown in FIG. 7B, illustrating an absolute outlet angle.

FIG. 7A illustrates rotor vane shapes of an impeller (i.e., vane shapes of a forward-curved fan) that is used in a temperature conditioning unit of a comparative example. FIG. 7B illustrates rotor vane shapes of an impeller (i.e., vane shapes of a backward-curved fan) that is used in each of the temperature conditioning units of the present invention. FIG. 8A is an enlarged view of an essential portion of each rotor vane (each of the vane shapes of the forward-curved fan) shown in FIG. 7A, illustrating an absolute outlet angle. FIG. 8B is an enlarged view of an essential portion of each rotor vane (each of the vane shapes of the backward-curved fan) shown in FIG. 7B, illustrating an absolute outlet angle.

In FIG. 7A, the vane shapes of the forward-curved fan are shown in cross section taken along a plane perpendicular to a rotating shaft. In FIG. 7B, the vane shapes of the backward-curved fan are shown in cross section taken along a plane perpendicular to a rotating shaft. FIGS. 8A and 8B show a comparison between respective velocity triangles of the absolute outlet angles at respective vane outlets of the fans. In cases where the backward-curved fan that is used has at least a part shaped to protrude forward in a rotation direction, its absolute outlet angle α2 becomes larger than absolute outlet angle α1 of the forward-curved fan and closer to 90 degrees. This means that a radial component of a flow increases, so that the flow can reach a distant place. Consequently, air can be blown against an object to be temperature-conditioned that is larger than an outer diameter of a fan case.

Height reduction of a side wall of the fan case increases the radial component of the discharged flow from the impeller, whereas height increase of the side wall of the fan case increases an axial component because of an increased amount by which the fan case changes the direction of the discharged flow. A proportion of the axial component to the radial component of the discharged flow can thus be adjusted by choice according to an axial height of the side wall of the fan case. With the forward-curved fan alone, static pressure does not rise, so that static pressure recovery is achieved by means of the fan case. With the backward-curved fan, each of the vanes is radially long, so that a flow velocity difference is larger between a vane inlet and the vane outlet. Consequently, the fan can raise the static pressure by itself. The backward-curved fan can thus obtain sufficient static pressure even when the side wall of the fan case is reduced in height. In addition, the backward-curved fan increases efficiency of a blower because its rotor vanes accelerate relative velocity, thus rendering secondary flow loss low as compared with the forward-curved fan.

(Comparison with Comparative Example)

Figure 18:
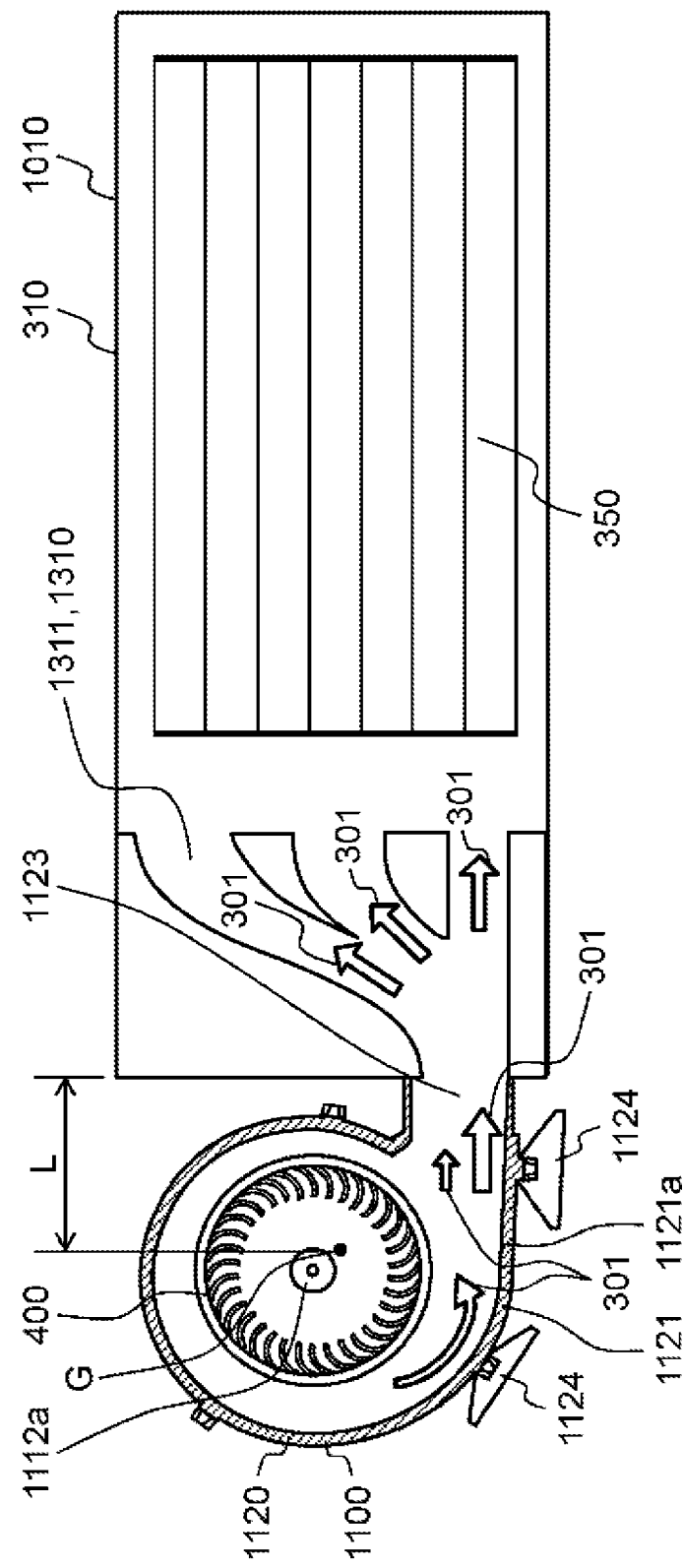
FIG. 18 is a sectional view illustrating the temperature conditioning unit of the comparative example.

FIG. 18 is a sectional view illustrating the temperature conditioning unit of the comparative example.

The temperature conditioning unit described in the first exemplary embodiment of the present invention is compared with the conventional temperature conditioning unit shown in FIG. 18. Temperature conditioning unit 1010 of the comparative example has scroll casing 1120 that is also used in a conventional vehicle-mounted air conditioning system.

Forward-curved fan 400 is mounted inside scroll casing 1120. Forward-curved fan 400 is also referred to as a sirocco fan. Forward-curved fan 400 discharges, in its circumferential direction, air that is drawn depthward in FIG. 18. Flow 301 of the air discharged from forward-curved fan 400 is directed toward discharge hole 1123 along side wall 1121 of scroll casing 1120.

Further details are explained.

The air discharged from forward-curved fan 400 is integrated circumferentially inside scroll casing 1120 that is shown as a comparative example. Scroll casing 1120 is such that a distance from rotating shaft 1112a to side wall 1121 gradually increases. Thus, flow 301 of the air discharged from forward-curved fan 400 is drawn toward outer-circumferential surface 1121a of side wall 1121. Accordingly, flow uniforming mechanism 1310 such as duct 1311 needs to be mounted inside housing 310 to uniform air flow 301 that is fed into housing 310.

However, centrifugal blower 1100 using forward-curved fan 400 causes long distance L from its center of gravity G to discharge hole 1123. Temperature conditioning unit 1010 thus becomes badly balanced and unstable when this centrifugal blower 1100 is mounted to housing 310. Accordingly, temperature conditioning unit 1010 is fixed to a peripheral member via mounting parts 1124. In this case, a variety of shape variations are required of mounting parts 1124 for adaptation of temperature conditioning unit 1010 to an environment where temperature conditioning unit 1010 is used.

Especially in cases where flow uniforming mechanism 1310 is formed separately from housing 310, a distance from center of gravity G to flow uniforming mechanism 1310 needs to be considered. Generally, the distance from center of gravity G to flow uniforming mechanism 1310 becomes long, so that the temperature conditioning unit becomes more badly balanced.

On the other hand, according to temperature conditioning unit 10 of the first exemplary embodiment that is shown in FIG. 1A, flow 301 of air discharged from blower 100 can provide a less uneven air flow to an interior of housing 300. Accordingly, a member to be temperature-conditioned that is accommodated by housing 300 can effectively be temperature-conditioned even when a flow uniforming mechanism is not mounted. Thus, temperature conditioning unit 10 of the first exemplary embodiment eliminates the need for the flow uniforming mechanism such as the duct. This means that temperature conditioning unit 10 of the first exemplary embodiment can reduce pressure loss and friction loss that are otherwise caused to air flow 301 by mounting of the flow uniforming mechanism as in the case of the comparative example. Consequently, temperature conditioning unit 10 of the first exemplary embodiment enables higher efficiency of blower 100, its structural simplification, its size reduction, and reduction of its parts count.

Moreover, temperature conditioning unit 10 of the first exemplary embodiment can reduce its height H when mounted with blower 100. The reason for this is attributed to a mounting direction of blower 100 with respect to housing 300. In other words, in temperature conditioning unit 1010 shown in the comparative example, rotating shaft 1112a of forward-curved fan 400 intersects air flow 301 that heads toward discharge hole 123. Accordingly, temperature conditioning unit 1010 shown in the comparative example requires, outwardly from housing 310, space that ensures diameter dimension L of forward-curved fan 400.

(Comparison between Forward-Curved Fan and Backward-Curved Fan)

Figure 8C:
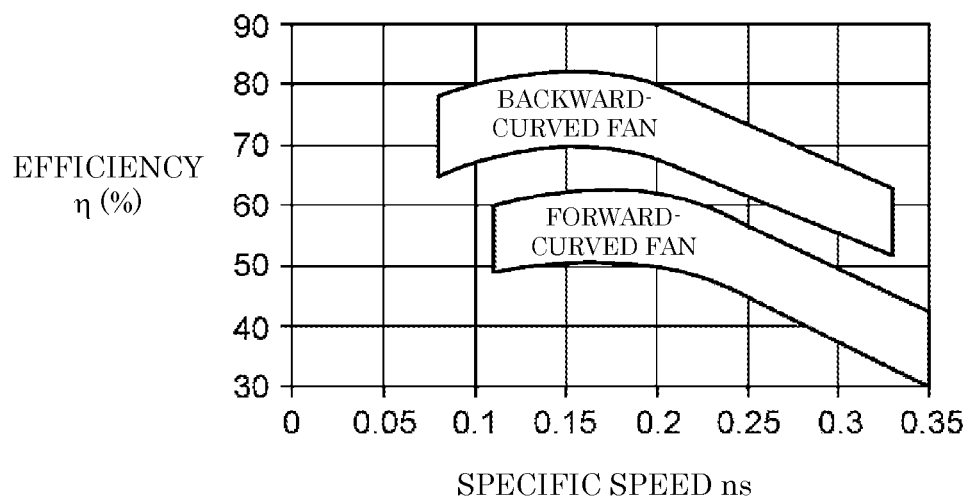
FIG. 8C is a graph showing respective efficiency characteristics of the impeller that is used in each of the temperature conditioning units of the present invention's exemplary embodiments and the impeller of the comparative example.
Figure 8D:
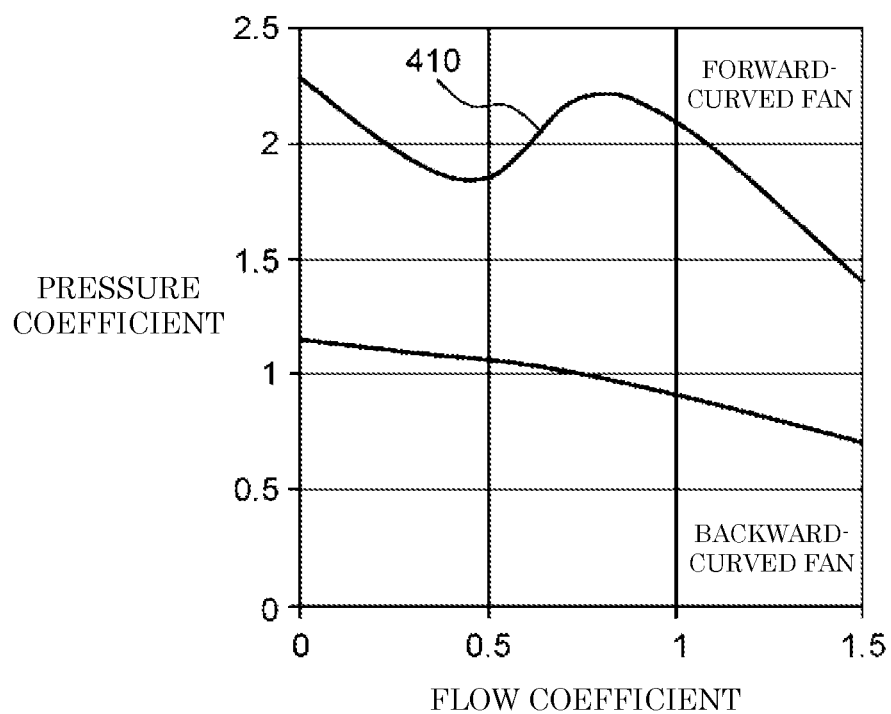
FIG. 8D is a graph showing respective flow coefficient-pressure coefficient characteristic relationships of the impeller that is used in each of the temperature conditioning units of the present invention's exemplary embodiments and the impeller of the comparative example.
Figure 8E:
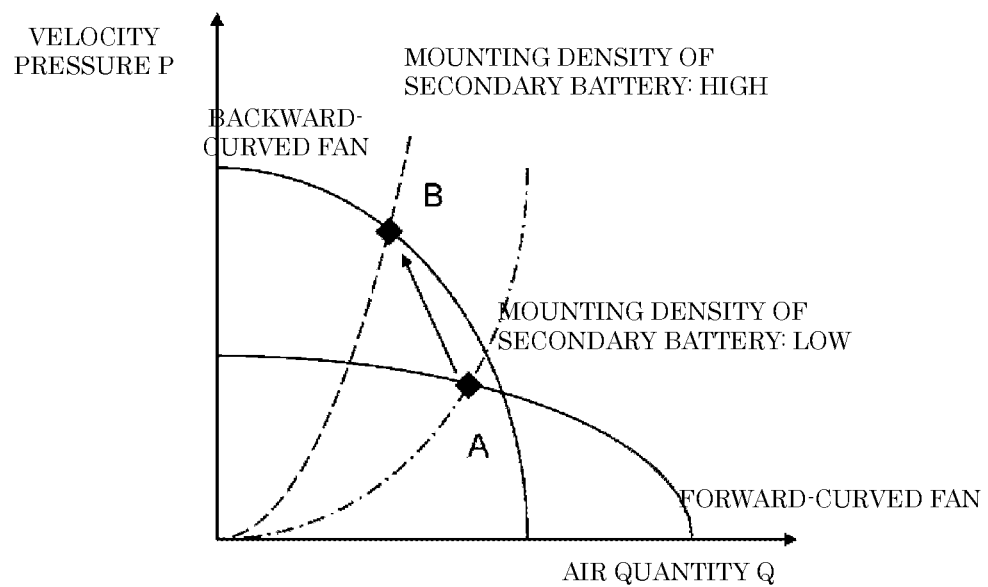
FIG. 8E is a graph showing respective air quantity-velocity pressure relationships of the impeller that is used in each of the temperature conditioning units of the present invention's exemplary embodiments and the impeller of the comparative example.

FIG. 8C is a graph showing respective efficiency characteristics of the impeller that is used in each of the temperature conditioning units of the present invention's exemplary embodiments and the impeller of the comparative example. FIG. 8D is a graph showing respective flow coefficient-pressure coefficient characteristic relationships of the impeller that is used in each of the temperature conditioning units of the present invention's exemplary embodiments and the impeller of the comparative example. FIG. 8E is a graph showing respective air quantity-velocity pressure relationships of the impeller that is used in each of the temperature conditioning units of the present invention's exemplary embodiments and the impeller of the comparative example.

Generally, the forward-curved fan is such that a deceleration rate of relative velocity is greater between the rotor vanes, so that secondary flow loss is higher. Thus, the forward-curved fan has lower efficiency than the backward-curved fan.

FIG. 8D shows the respective flow coefficient-pressure coefficient relationships of the forward-curved fan and the backward-curved fan.

As shown in FIG. 8D, the forward-curved fan has a higher work coefficient than the backward-curved fan. However, in cases where the forward-curved fan is operated at low flow rates, there exists unstable region 410 where a pressure coefficient changes from a downward-sloping characteristic to an upward-sloping characteristic.

On the other hand, the backward-curved fan has a lower work coefficient than the forward-curved fan. However, in the case of the backward-curved fan, there is not such an unstable region of characteristic change as in the case of the forward-curved fan. As such, the backward-curved fan can be used stably throughout an entire region. Consequently, the backward-curved fan can obtain high output by rotating at high speed.

In FIGS. 7A and 7B, the rotor vane shapes of the forward-curved fan shown as a comparative example and the rotor vane shapes of the backward-curved fan that is adopted in each of the exemplary embodiments of the present invention are shown in cross section taken along the plane perpendicular to fan rotating shaft 112a. FIGS. 8A and 8B show the comparison between the respective velocity triangles at the respective rotor vane outlets of the forward-curved and backward-curved fans.

As shown in FIGS. 7A and 8A, a cross section of the forward-curved fan's rotor vane 1111 that is taken along a direction intersecting rotating shaft 112a has the shape of an arc that is concavely curved in a direction in which impeller disk 1112 rotates. Rotor vanes 1111 are such that their respective inner-peripheral-side ends 1111a positioned along rotating shaft 112a are respectively positioned rearwardly of corresponding outer-peripheral-side ends 111b positioned opposite from rotating shaft 112a.

When the forward-curved fan is rotated, absolute outlet angle α1 of air discharged from each rotor vane 1111 becomes an angle approaching a direction tangent to an outer periphery of impeller disk 1112. With the use of the forward-curved fan, a flow of the air thus has a smaller component directed radially of impeller disk 1112, so that it is difficult for the air flow to reach a distant place.

On the other hand, as shown in FIGS. 7B and 8B, a cross section of the backward-curved fan's rotor vane 111 that is taken along a direction intersecting rotating shaft 112a has the shape of an arc that is convexly curved in a direction in which impeller disk 112 rotates. Rotor vanes 111 are such that their respective inner-peripheral-side ends 111a positioned along rotating shaft 112a are respectively positioned forwardly of corresponding outer-peripheral-side ends 111b positioned opposite from rotating shaft 112a.

When the backward-curved fan is rotated, absolute outlet angle α2 of air discharged from each rotor vane 111 becomes a wide angle with respect to a direction tangent to an outer periphery of impeller disk 112. With the use of the backward-curved fan, a flow of the air thus has a larger component directed radially of impeller disk 112, so that the air flow can reach a distant place.

As shown in FIG. 8E, with the forward-curved fan alone, the static pressure does not rise, so that static pressure recovery is achieved by means of the fan case such as a scroll casing.

On the other hand, as shown in FIG. 7B, rotor vanes 111 of the backward-curved fan are long radially of impeller disk 112. As such, when impeller 110 is rotated, the air flow velocity difference becomes larger between inner-peripheral-side end 111a that is the inlet of rotor vane 111 and outer-peripheral-side end 111b that is the outlet of rotor vane 111. Thus, as shown in FIG. 8E, the backward-curved fan can raise the static pressure by itself. With use of each of the temperature conditioning units of the present invention's exemplary embodiments, an operating point changes from A to B with increase of mounting density of a member to be temperature-conditioned accommodated by housing 300.

Through use of this characteristic, each of the temperature conditioning units of the present invention's exemplary embodiments is reduced in size.

In temperature conditioning unit 10 of the present exemplary embodiment described above, air flows along the first airflow guide shape defined by an inner wall of fan case 120 and along a second airflow guide shape of impeller disk 112 that is defined by outer-peripheral-side ends 111b. Accordingly, temperature conditioning unit 10 can be reduced in size.

The first airflow guide shape may be a curved surface of the inner wall of fan case 120. The second airflow guide shape may be a curved side of impeller disk 112 that is defined by outer-peripheral-side ends 111b, and the curved side may be curved toward discharge hole 123 with a convex surface of the curved side being positioned on a side of intake hole 122 of the curved side and a concave surface of the curved side being positioned on a side of discharge hole 123 of the curved side. In this way, temperature conditioning unit 10 can be reduced in size.

Respective rear edges of rotor vanes 111 may be positioned along the outer periphery of impeller disk 112, while respective front edges of rotor vanes 111 may be centered along rotating shaft 112a to be respectively positioned forwardly of the corresponding rear edges in the rotation direction of impeller 110.

Alternatively, the respective rear edges of the rotor vanes may be positioned along the outer periphery of impeller disk 112, the respective front edges of rotor vanes 111 may be centered along rotating shaft 112a to be respectively positioned forwardly of the corresponding rear edges in the rotation direction of impeller 110, and rotor vanes 111 may each have a convexly curved surface on a forward side of rotor vane 111 in the rotation direction of impeller 110. In this way, a radial component of an air flow is increased, so that the flow can reach a distant place. Consequently, the air can be blown against an object to be temperature-conditioned that is larger than an outer diameter of a fan case.

Object 350 to be temperature-conditioned may be a secondary battery.

Alternatively, object 350 to be temperature-conditioned may be a power converter.

Fifth Exemplary Embodiment

Figure 9A:
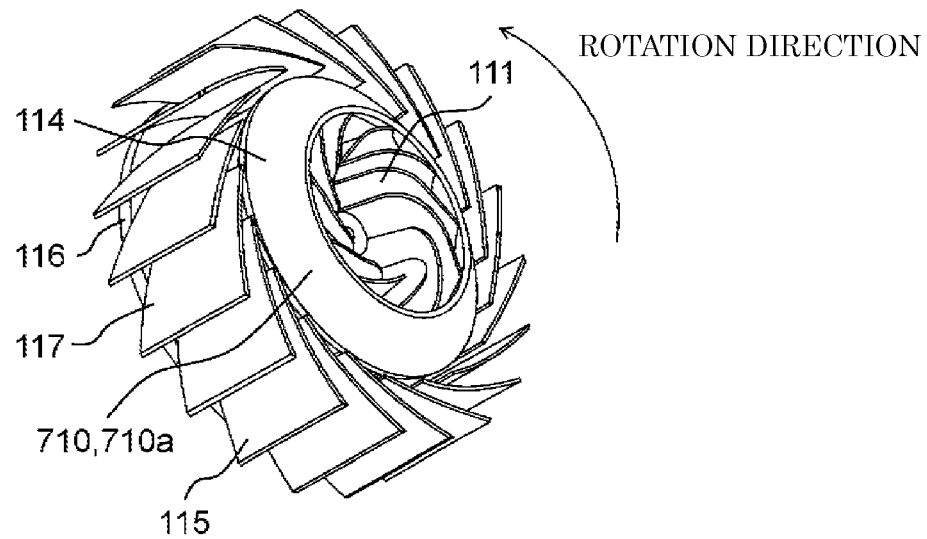
FIG. 9A is a perspective view illustrating an aspect in which a diffuser is added to an impeller according to a fifth exemplary embodiment of the present invention.
Figure 9B:
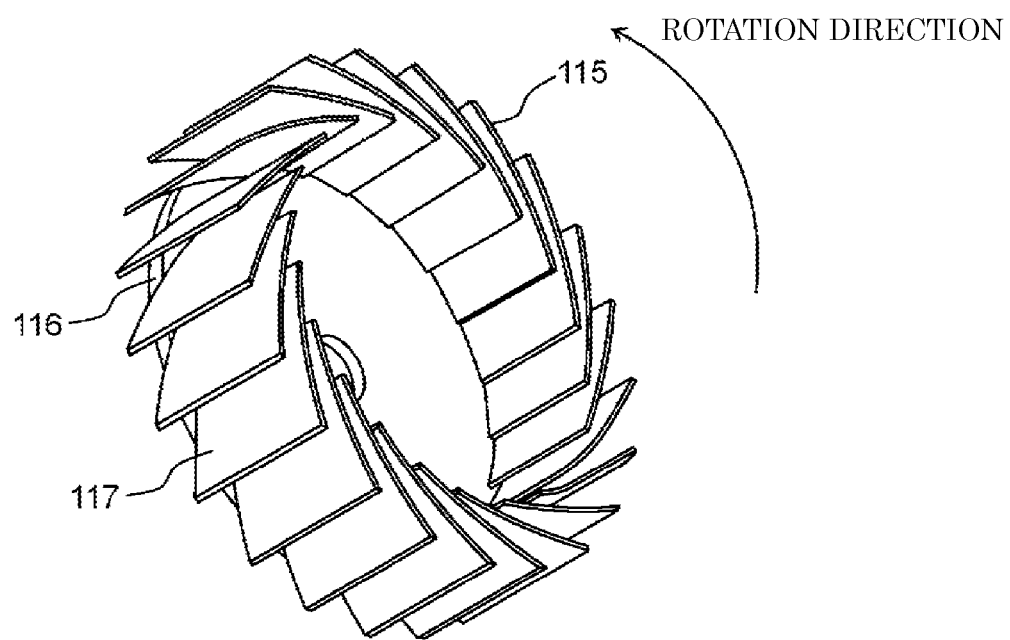
FIG. 9B is a perspective front view of the diffuser according to the fifth exemplary embodiment of the present invention.
Figure 9C:
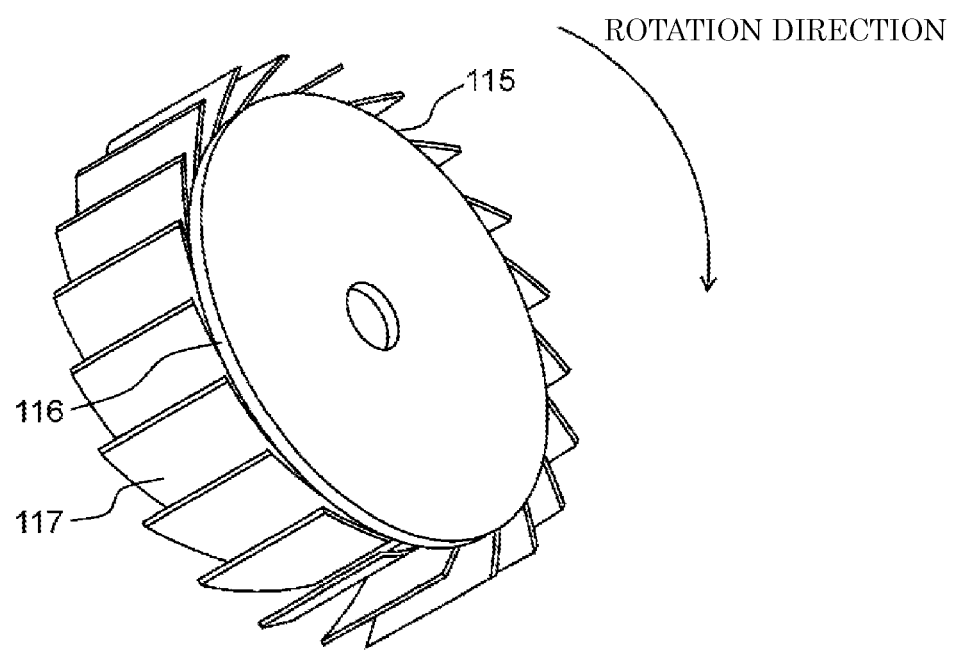
FIG. 9C is a perspective rear view of the diffuser according to the fifth exemplary embodiment of the present invention.

FIG. 9A is a perspective view illustrating an aspect in which a diffuser is added to an impeller according to a fifth exemplary embodiment of the present invention. FIG. 9B is a perspective front view of the diffuser. FIG. 9C is a perspective rear view of the diffuser.

In a structure of the fifth exemplary embodiment, diffuser 115 is added to impeller 110 of each of the first through fourth exemplary embodiments. Diffuser 115 is disposed between impeller 110 and electric motor 200 that is a rotary drive source. Diffuser 115 includes substantially disk-shaped diffuser plate 116 that is disposed on a plane perpendicular to a rotating shaft of electric motor 200, and a plurality of stator vanes 117 that is erected on an intake-hole-end surface of diffuser plate 116 to regulate a flow of centrifugal air discharged from impeller 110.

While decelerating, between its stator vanes 117 of diffuser 115, the air (centrifugal air) output by impeller 110, diffuser 115 performs a pressure raising function, thereby increasing pressure of the air output by blower 100.

As described above, temperature conditioning unit 10 of the present exemplary embodiment includes diffuser 115 that is disposed between impeller 110 and the rotary drive source to regulate the flow of the centrifugal air discharged from impeller 110. In this way, the pressure of the air output by blower 100 can be increased.

Alternatively, temperature conditioning unit 10 includes diffuser 115 between impeller 110 and the rotary drive source, and this diffuser 115 includes substantially disk-shaped diffuser plate 116 that is disposed on the plane perpendicular to the rotating shaft of the rotary drive source, and the plurality of stator vanes 117 that is erected on the intake-hole-end surface of diffuser plate 116 to regulate the flow of the centrifugal air discharged from impeller 110. In this way, the pressure of the air output by blower 100 can be increased.

Diffuser 115 may include metal or resin.

Sixth Exemplary Embodiment

Figure 10A:
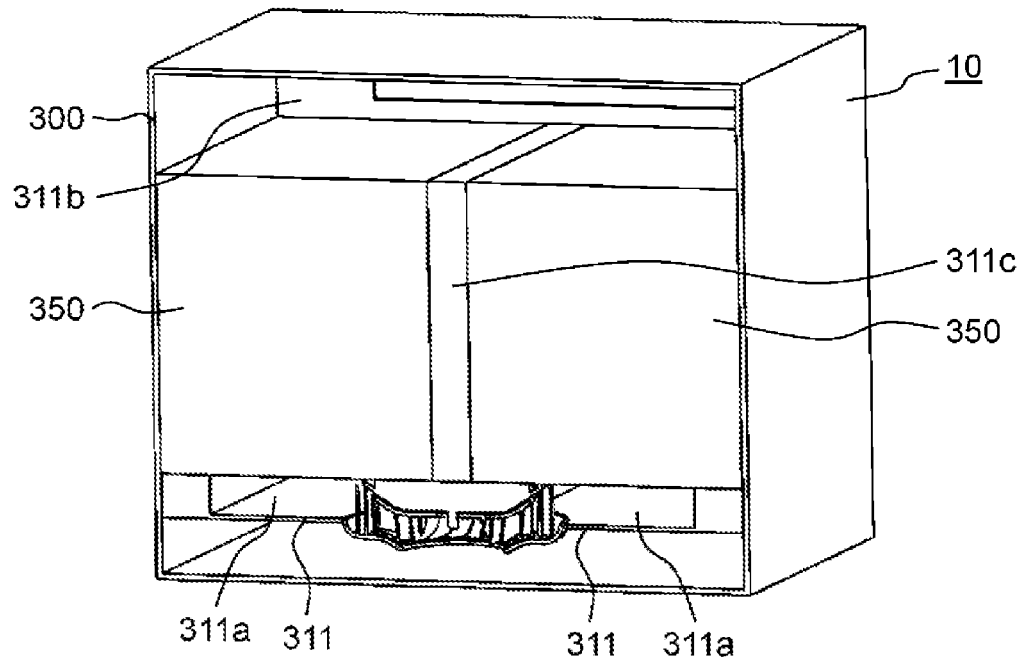
FIG. 10A is a perspective view schematically illustrating an internal structure of a temperature conditioning unit according to a sixth exemplary embodiment of the present invention.
Figure 10B:
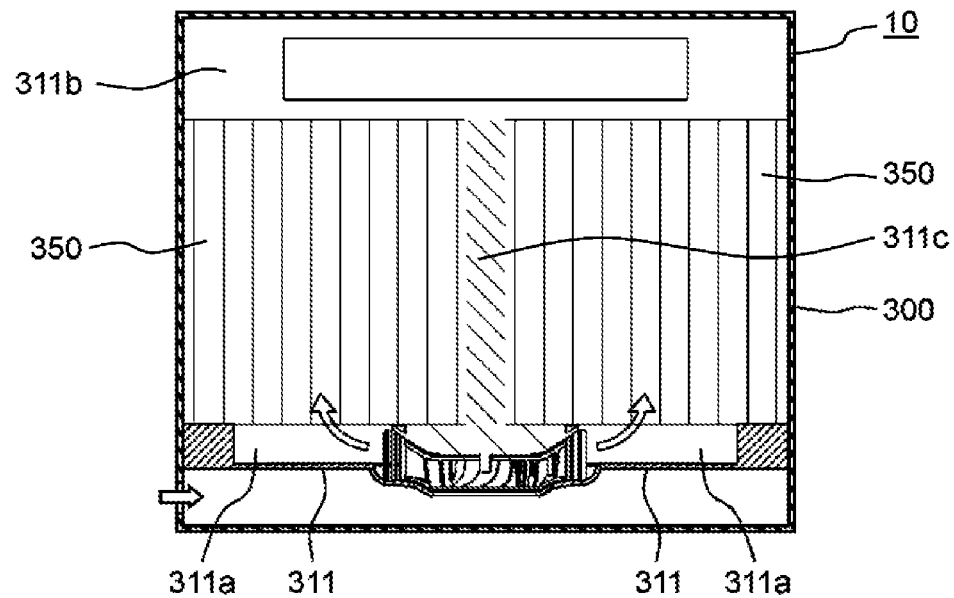
FIG. 10B is a sectional view of the temperature conditioning unit according to the sixth exemplary embodiment of the present invention.

FIG. 10A is a perspective view schematically illustrating an internal structure of temperature conditioning unit 10 according to a sixth exemplary embodiment of the present invention. FIG. 10B is a sectional view of temperature conditioning unit 10.

In temperature conditioning unit 10 according to the sixth exemplary embodiment, intake-side back-end chamber 311a is formed of a plurality of spaces. In this structure, as shown in FIGS. 10A and 10B, blower 100 and electric motor 200 are disposed in a part where partition 311c forms a boundary between adjacent intake-side back-end chambers 311a. Partition 311c is not a heat generator, thus not requiring cooling. It is for this reason that blower 100 and electric motor 200 can be disposed in the part where there is partition 311c.

In each of temperature conditioning units 10 of the exemplary embodiments excluding the sixth exemplary embodiment, an object to be temperature-conditioned needs to be cooled by discharging air toward a portion facing a vicinity of a counter suction surface of electric motor 200 (that is to say, a vicinity of a central portion of an electric-motor surface on a non-load connection side of an output shaft of electric motor 200). However, temperature conditioning unit 10 of the sixth exemplary embodiment has no object to be temperature-conditioned near a counter suction surface of the electric motor (that is to say, near a central portion of an electric-motor surface on a non-load connection side of the electric motor's output shaft), so that discharge of air is not required there for cooling. The air accumulating in each intake-side back-end chamber 311a is fed to an object to be temperature-conditioned. Accordingly, an effect of cooling or warming a component such as a battery pack is enhanced.

As described above, intake-side back-end chamber 311a may be formed of the plurality of spaces in temperature conditioning unit 10 of the present exemplary embodiment.

Moreover, in temperature conditioning unit 10, blower 100 provided to housing 300 may have discharge hole 123 only where intake-side back-end chamber 311a faces.

Seventh Exemplary Embodiment

Figure 11:
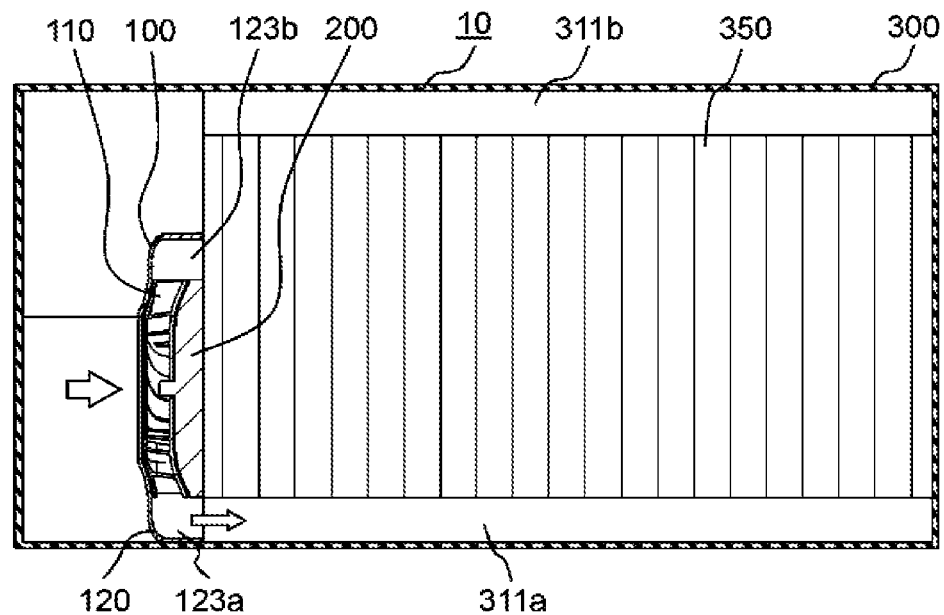
FIG. 11 is a sectional view illustrating a structure of a temperature conditioning unit according to a seventh exemplary embodiment of the present invention.

FIG. 11 is a sectional view illustrating a structure of temperature conditioning unit 10 according to a seventh exemplary embodiment of the present invention.

Temperature conditioning unit 10 shown in FIG. 11 has a limited outside shape. Due to a position of object 350 to be temperature-conditioned inside housing 300, blower 100 is disposed in such a position as to face not a maximum-area surface of the object to be temperature-conditioned, but a surface perpendicular to the maximum-area surface. In this case, a discharged flow guided by fan case 120 toward a rotating shaft of impeller 110 preferably goes only to a peripheral part that faces intake-side back-end chamber 311a.

Figure 12A:
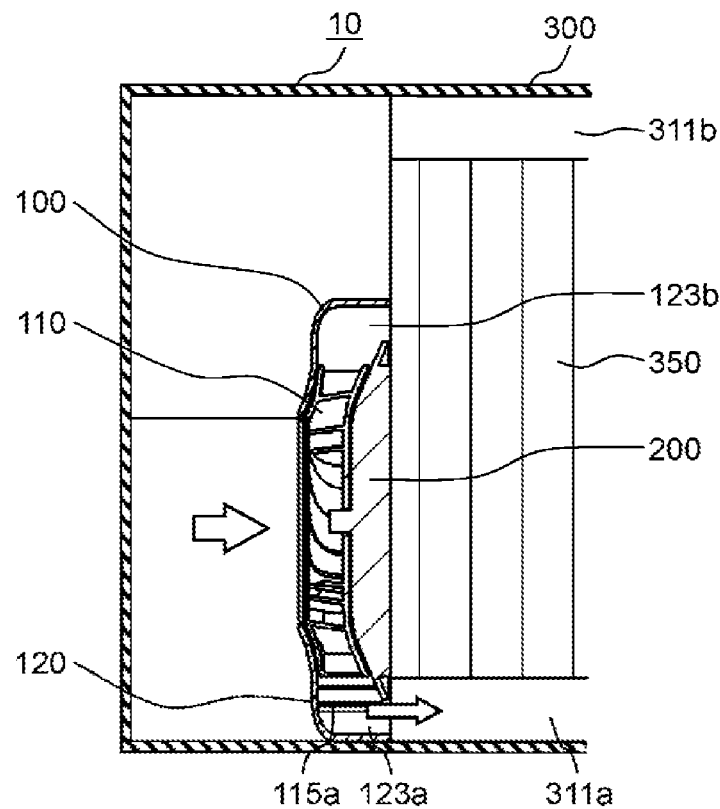
FIG. 12A is an enlarged view of an essential portion of a temperature conditioning unit according to the seventh exemplary embodiment of the present invention.
Figure 12B:
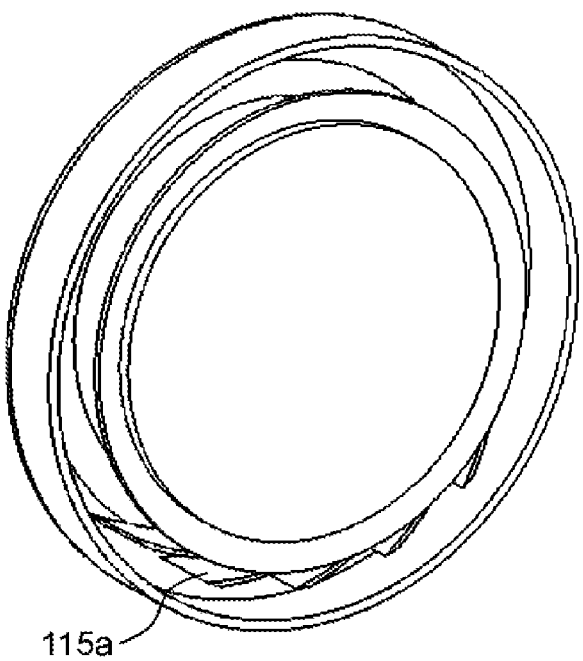
FIG. 12B is a perspective view of a diffuser according to the exemplary embodiment of the present invention.

FIG. 12A is an enlarged view of an essential portion of temperature conditioning unit 10 according to the seventh exemplary embodiment of the present invention. FIG. 12B is a perspective view of a diffuser according to the seventh exemplary embodiment of the present invention.

In cases where diffuser 115a is disposed along an outer periphery of impeller 110, diffuser 115a is disposed only along an opening such as discharge hole 123a shown in FIGS. 12A and 12B or has its vanes shortened radially of the diffuser along a closed part such as discharge hole 123b. This is to avoid unintended increases in collision loss and wall friction loss that are otherwise caused by a diffuser having an effect of regulating a flow in a fixed direction because at a part where the discharge hole is closed, the discharged flow from impeller 110 collides against fan case 120 and a support or the like of the housing that closes the discharge part and thus has increased turbulence. In order not to hinder a peripheral component, diffuser 115a is not disposed along the part corresponding to discharge hole 123b, that is to say, an area where the discharged flow is blocked. In this way, the loss increases can be suppressed.

As described above, temperature conditioning unit 10 of the present exemplary embodiment may have diffuser 115a disposed only along a part facing discharge hole 123a.

Eighth Exemplary Embodiment

Figure 13:
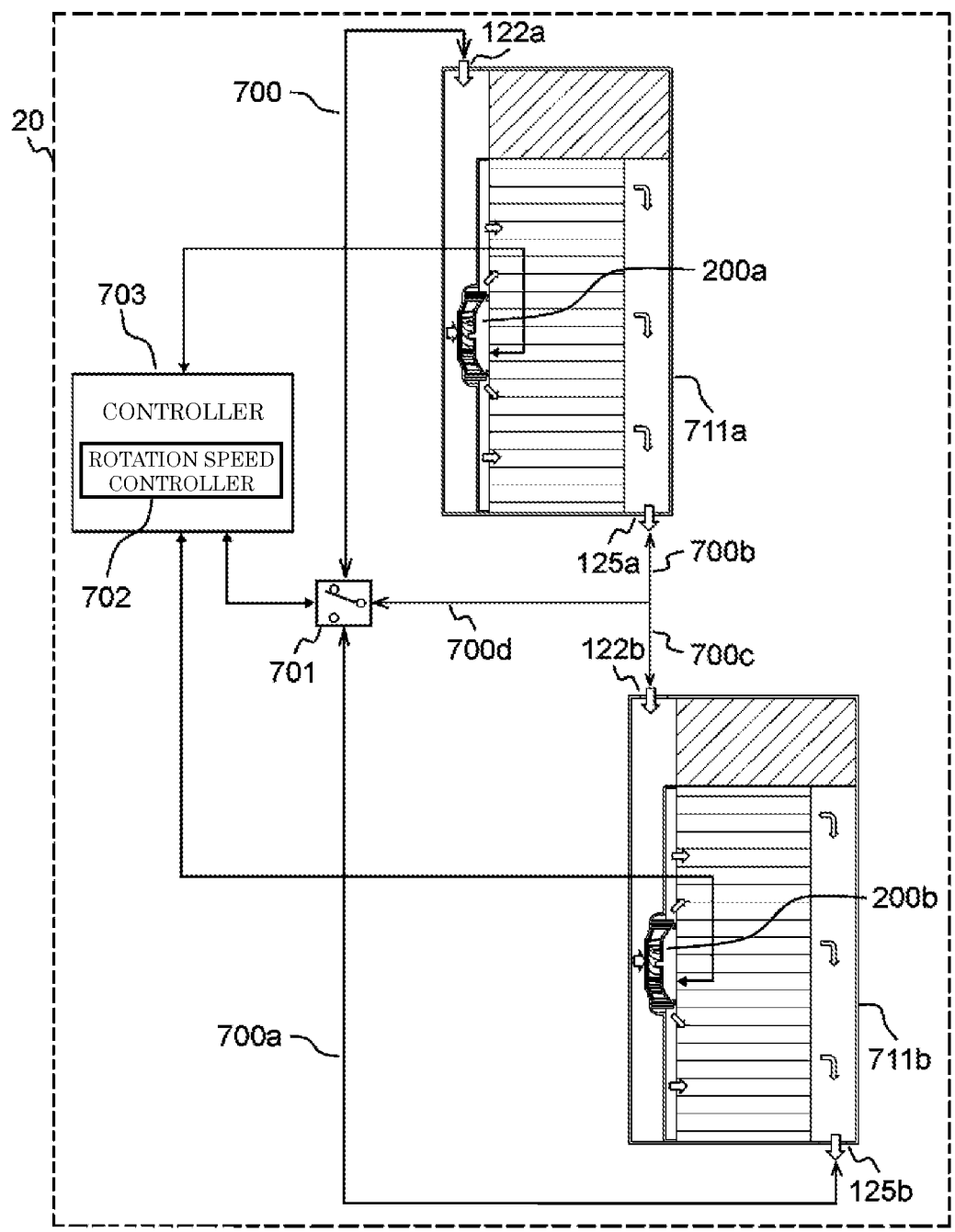
FIG. 13 is a schematic system configuration diagram of a temperature conditioning system according to an eighth exemplary embodiment of the present invention.
Figure 14:
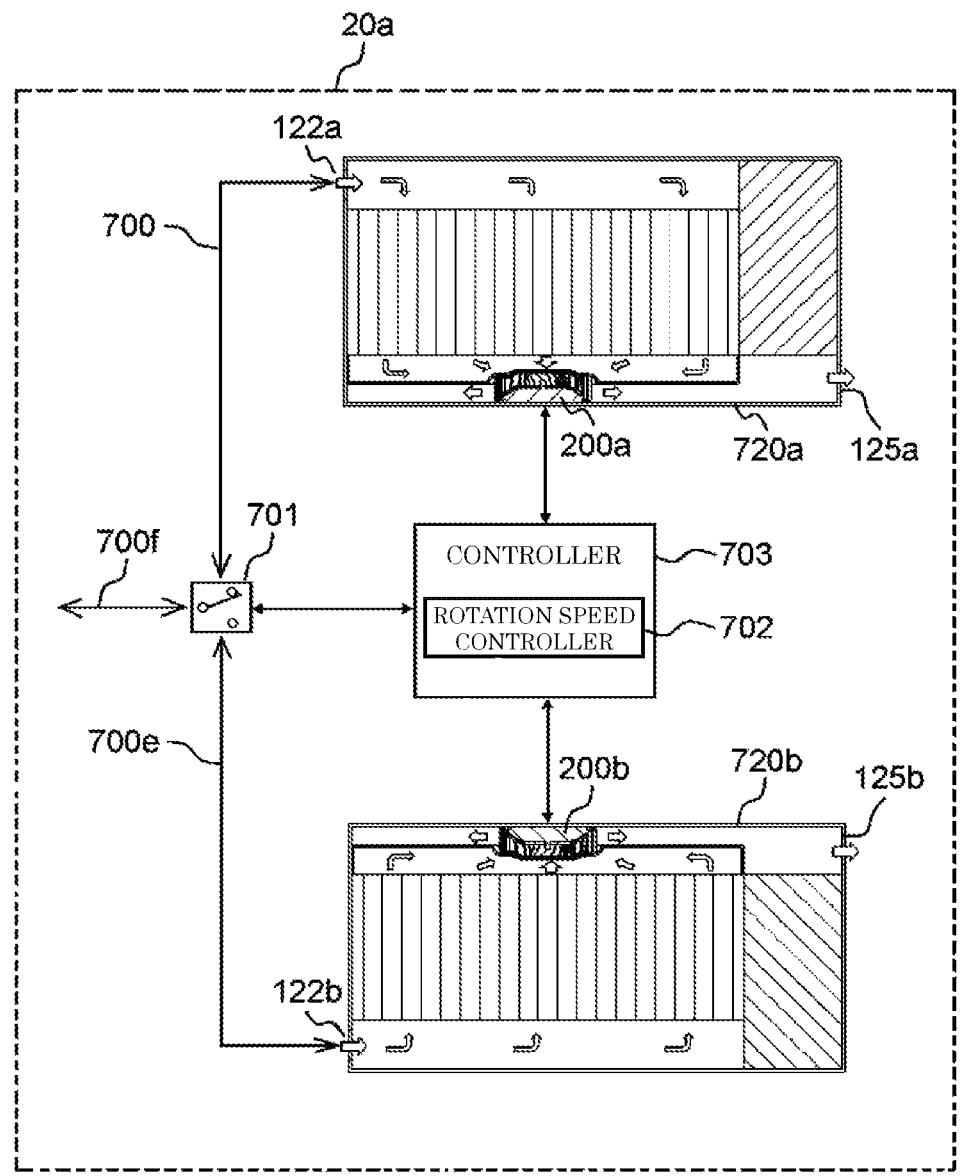
FIG. 14 is a schematic system configuration diagram of another temperature conditioning system according to the eighth exemplary embodiment of the present invention.
Figure 15:
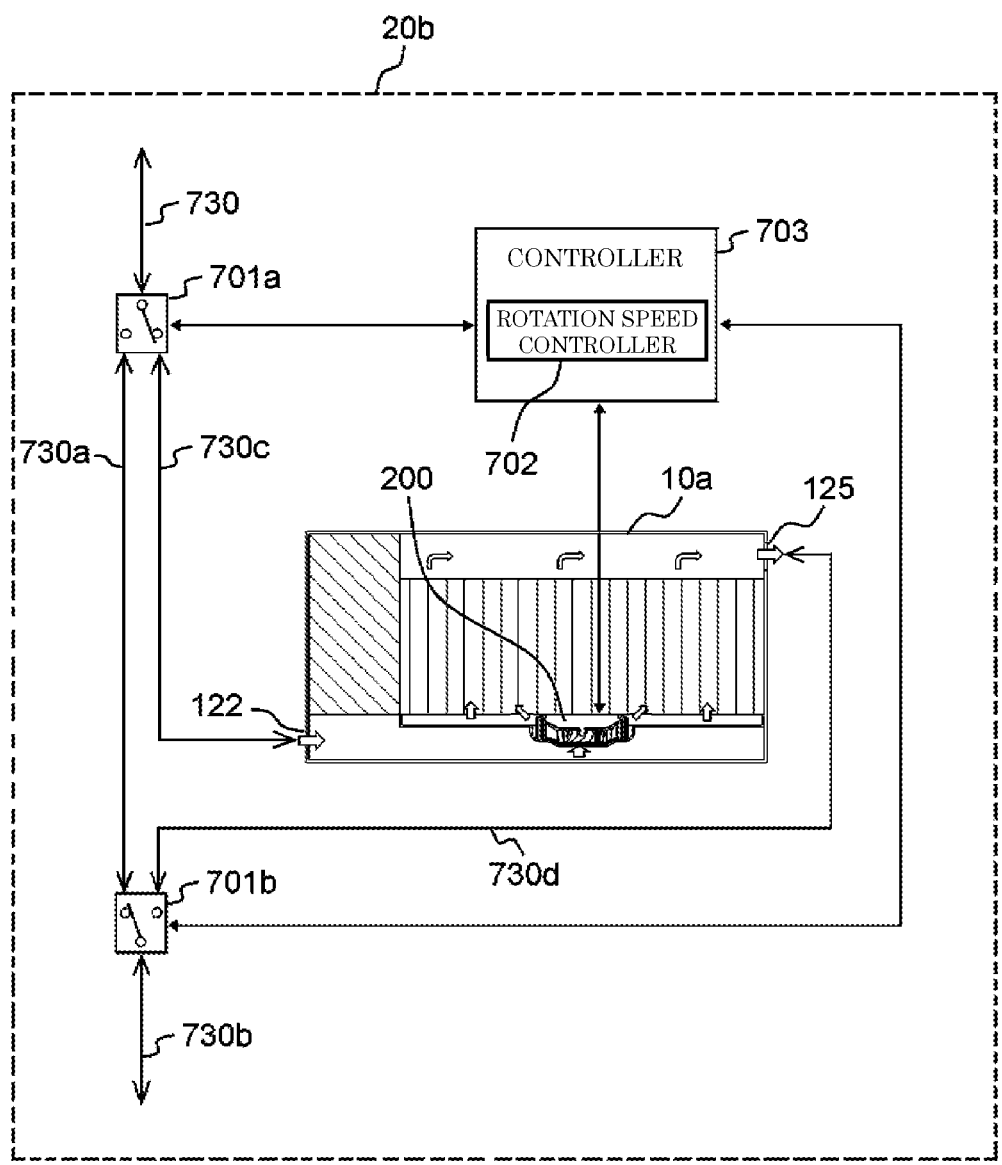
FIG. 15 is a schematic system configuration diagram of still another temperature conditioning system according to the eighth exemplary embodiment of the present invention.

FIG. 13 is a schematic system configuration diagram of temperature conditioning system 20 according to an eighth exemplary embodiment of the present invention. FIG. 14 is a schematic system configuration diagram of another temperature conditioning system 20a according to the eighth exemplary embodiment of the present invention. FIG. 15 is a schematic system configuration diagram of still another temperature conditioning system 20b according to the eighth exemplary embodiment of the present invention.

Figure 16:
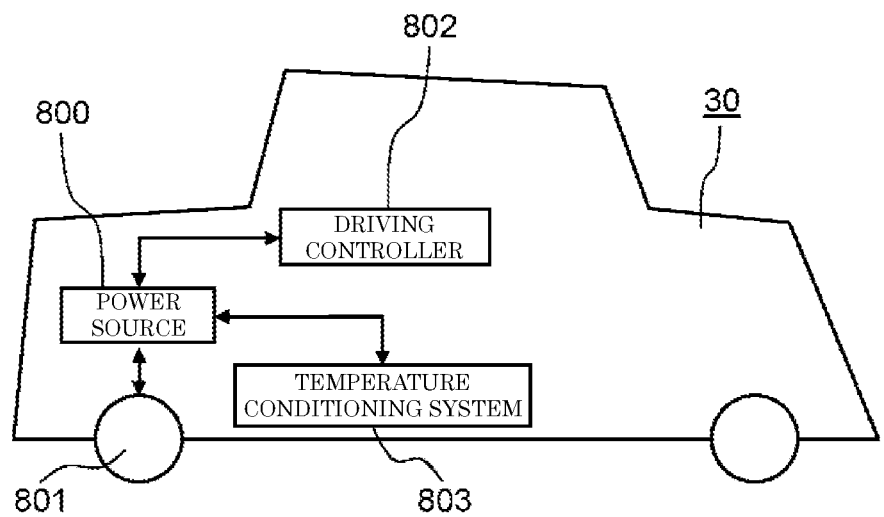
FIG. 16 is a schematic view of a vehicle according to the eighth exemplary embodiment of the present invention.
Figure 17:
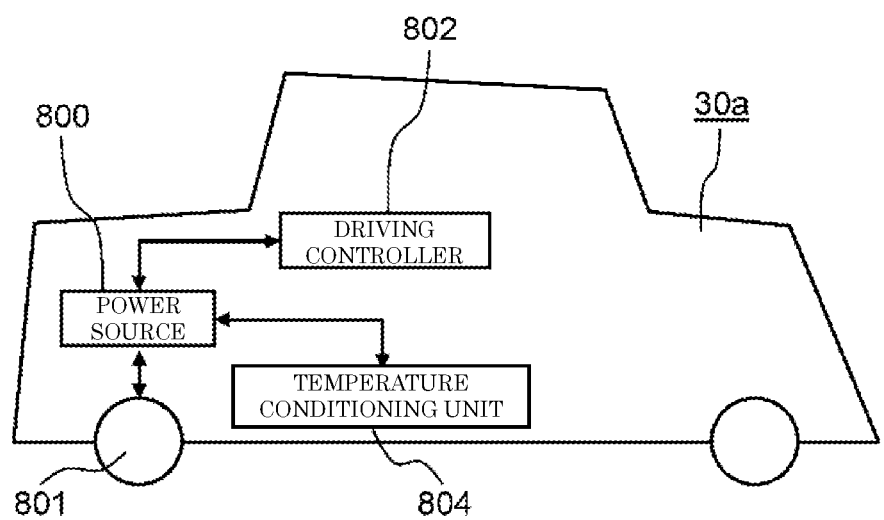
FIG. 17 is a schematic view of another vehicle according to the eighth exemplary embodiment of the present invention.

FIG. 16 is a schematic view of vehicle 30 according to the eighth exemplary embodiment of the present invention. FIG. 17 is a schematic view of another vehicle 30a according to the eighth exemplary embodiment of the present invention.

Structures similar to structures of the temperature conditioning unit of the first exemplary embodiment have the same reference marks, and the descriptions of the structures of the temperature conditioning unit of the first exemplary embodiment are applied by analogy to these structures.

As shown in FIGS. 13 to 15, the temperature conditioning systems according to the eighth exemplary embodiment of the present invention are each structured as follows.

Temperature conditioning system 20 according to the eighth exemplary embodiment includes, as shown in FIG. 13, first temperature conditioning unit 711a, second temperature conditioning unit 711b, a plurality of ducts 700, 700a, 700b, 700c, and 700d, switching unit 701, rotation speed controller 702, and controller 703.

Temperature conditioning units 10 described in the first exemplary embodiment can be used as first temperature conditioning unit 711a and second temperature conditioning unit 711b. Each of the temperature conditioning units shown in FIG. 13 is the one described with reference to FIG. 1A in the first exemplary embodiment.

Among the plurality of ducts, ducts 700b, 700c connect exhaust hole 125a of first temperature conditioning unit 711a and intake hole 122b of second temperature conditioning unit 711b. Intake hole 122b draws air into the housing. Exhaust hole 125a is where the drawn air is exhausted out of the housing.

Alternatively, among the plurality of ducts, ducts 700, 700a connect intake hole 122a of first temperature conditioning unit 711a and exhaust hole 125b of second temperature conditioning unit 711b.

Switching unit 701 changes a connection state among ducts 700, 700a, and 700d.

Rotation speed controller 702 controls at least one of rotation speed of electric motor 200a of first temperature conditioning unit 711a and rotation speed of electric motor 200b of second temperature conditioning unit 711b.

Controller 703 controls switching unit 701 and rotation speed controller 702. This controller 703 controls passages of air flowing through the plurality of ducts 700, 700a, 700b, 700c, and 700d or volumes of air.

As shown in FIG. 14, temperature conditioning system 20a according to the eighth exemplary embodiment includes first temperature conditioning unit 720a, second temperature conditioning unit 720b, a plurality of ducts 700, 700e, and 700f, switching unit 701, rotation speed controller 702, and controller 703.

The temperature conditioning units described in the first exemplary embodiment can be used as first temperature conditioning unit 720a and second temperature conditioning unit 720b. Each of the temperature conditioning units shown in FIG. 14 is the one described with reference to FIG. 1A in the first exemplary embodiment.

Among the plurality of ducts, ducts 700, 700e connect intake hole 122a of first temperature conditioning unit 720a and intake hole 122b of second temperature conditioning unit 720b.

Alternatively, the plurality of ducts 700, 700e, and 700f may connect exhaust hole 125a of first temperature conditioning unit 720a and exhaust hole 125b of second temperature conditioning unit 720b.

Switching unit 701 changes a connection state among the plurality of ducts 700, 700e, and 700f.

Rotation speed controller 702 controls at least one of rotation speed of electric motor 200a of first temperature conditioning unit 720a and rotation speed of electric motor 200b of second temperature conditioning unit 720b.

Controller 703 controls switching unit 701 and rotation speed controller 702. This controller 703 controls passages of air flowing through the plurality of ducts 700, 700e, and 700f or volumes of air.

Alternatively, temperature conditioning system 20b according to the eighth exemplary embodiment includes, as shown in FIG. 15, temperature conditioning unit 10a, first ducts 730, 730a, and 730b, second ducts 730c, 730d, switching units 701a, 701b, rotation speed controller 702, and controller 703.

Each of the temperature conditioning units described in the first exemplary embodiment can be used as temperature conditioning unit 10a. The temperature conditioning unit shown in FIG. 15 is the one described with reference to FIG. 1A in the first exemplary embodiment.

Through first ducts 730, 730a, and 730b, air passes but not through temperature conditioning unit 10a.

Through second duct 730c, air passes to be fed to temperature conditioning unit 10a. The air discharged from temperature conditioning unit 10a passes through second duct 730d. It is to be noted that the air is drawn in from intake hole 122 and is exhausted from exhaust hole 125.

First ducts 730, 730a, and 730b and second ducts 730c, 730d are connected to switching units 701a, 701b. Switching units 701a, 701b perform switching between air flows.

Rotation speed controller 702 controls at least rotation speed of electric motor 200 of temperature conditioning unit 10a.

Controller 703 controls switching units 701a, 701b and rotation speed controller 702. This controller 703 controls passages of the air flowing through first ducts 730, 730a, and 730b and second ducts 730c, 730d or volumes of air.

FIG. 16 is a schematic view of vehicle 30 according to the eighth exemplary embodiment of the present invention. Vehicle 30 includes power source 800, drive wheels 801, driving controller 802, and temperature conditioning system 803.

Drive wheels 801 are driven by power supplied from power source 800. Driving controller 802 controls power source 800. Each of temperature conditioning systems 20, 20a, and 20b described above can be used as temperature conditioning system 803.

FIG. 17 is a schematic view of another vehicle 30a according to the eighth exemplary embodiment of the present invention. Vehicle 30a includes power source 800, drive wheels 801, driving controller 802, and temperature conditioning unit 804.

Drive wheels 801 are driven by power supplied from power source 800. Driving controller 802 controls power source 800. Each of the temperature conditioning units described in the first exemplary embodiment can be used as temperature conditioning unit 804.

Further details are explained with reference to FIGS. 16 and 17.

As shown in FIG. 16, temperature conditioning system 803 of the eighth exemplary embodiment is mounted to vehicle 30. By adopting the following configuration, temperature conditioning system 803 effectively cools and warms a member to be temperature-conditioned when mounted to vehicle 30.

A plurality of the temperature conditioning units of the present invention's foregoing exemplary embodiments can be used in temperature conditioning system 803 of the eighth exemplary embodiment. Temperature conditioning system 803 includes a plurality of ducts connecting intake holes and vent holes of the temperature conditioning units. Temperature conditioning system 803 includes a switching unit that changes an amount of air flowing through the ducts or an air flow path.

For example, the temperature conditioning units are connected by the ducts in cases where intake-side temperature is lower than ordinary temperature. With this configuration, the member to be temperature-conditioned can efficiently be temperature-conditioned.

Alternatively, temperature conditioning system 803 of the eighth exemplary embodiment has a plurality of ducts respectively connected to an intake hole and a vent hole of the temperature conditioning unit. This temperature conditioning system 803 includes switching units that change an amount of air flowing through the ducts or an air flow path.

For example, the plurality of ducts is respectively connected to the intake hole and the vent hole of the temperature conditioning unit in the present exemplary embodiment.

As shown in FIG. 15, duct 730 has one end connected outwardly of the vehicle and another end connected to switching unit 701a. Duct 730a has one end connected to switching unit 701a and another end connected to switching unit 701b. Duct 730c has one end connected to switching unit 701a and another end connected to intake hole 122 of temperature conditioning unit 10a. Duct 730d has one end connected to exhaust hole 125 of temperature conditioning unit 10a and another end connected to switching unit 701b.

In cases where temperature outside vehicle 30 falls within a predetermined range, outside air can be introduced directly into vehicle 30 through the ducts in this configuration. In cases where the temperature outside vehicle 30 falls outside the predetermined range, the outside air can be introduced into vehicle 30 through the ducts and the temperature conditioning unit.

In other words, temperature conditioning system 803 can change air that is provided to a member to be temperature-conditioned according to the temperature outside the vehicle. Thus, temperature conditioning system 803 can efficiently temperature-condition the member to be temperature-conditioned while saving energy.

It is to be noted that in this temperature conditioning system 803, a threshold of the temperature outside the vehicle that is used for duct switching may be set appropriately according to a purpose. Moreover, the intake of the air from outside the vehicle that is associated with the duct switching can be done by switching that is based on atmospheric pressure instead of the temperature outside the vehicle in temperature conditioning system 803.

The description of vehicle 30 shown in FIG. 16 can be applied by analogy to vehicle 30*a* shown in FIG. 17 by replacing temperature conditioning system 803 with temperature conditioning unit 804.

In each of the above exemplary embodiments, the temperature conditioning unit has been described as one example used for a battery of a hybrid car but is not limited to this. The temperature conditioning units of the exemplary embodiments of the present invention are also applicable to temperature-conditioning of an engine control unit, an inverter device, an electric motor, and others.

As described above, the temperature conditioning unit of the present exemplary embodiment further includes an exhaust hole where air that is drawn into a housing is discharged out of the housing. In this way, the air drawn into the housing can be discharged out of the housing.

As described above, temperature conditioning system 20 or 20*a* of the present exemplary embodiment includes the first temperature conditioning unit, the second temperature conditioning unit, and the plurality of ducts connecting exhaust hole 122*a* or intake hole 125*a* of the first temperature conditioning unit and intake hole 122*b* or exhaust hole 125*b* of the second temperature conditioning unit. Moreover, the temperature conditioning system of the present exemplary embodiment includes the switching unit that changes the connection state among the plurality of ducts, rotation speed controller 702 that controls the at least one of the rotation speed of the rotary drive source of the first temperature conditioning unit and the rotation speed of the rotary drive source of the second temperature conditioning unit, and controller 703 that controls the switching unit and rotation speed controller 702 for controlling the passages of the air flowing through the plurality of ducts or the volumes of the air. The temperature conditioning system of the present exemplary embodiment can thus efficiently temperature-condition a member to be temperature-conditioned while saving energy.

Temperature conditioning system 20*b* of the present exemplary embodiment includes temperature conditioning unit 10*a*, first ducts 730, 730*a*, and 730*b* through which air passes but not through temperature conditioning unit 10*a*, second duct 730*c*, 730*d* through which air passes to be fed to temperature conditioning unit 10*a* or the air discharged from temperature conditioning unit 10*a* passes, and switching units 701*a*, 701*b* that are connected to the first ducts and the second ducts and perform the switching between the air flows. Moreover, temperature conditioning system 20*b* of the present exemplary embodiment includes rotation speed controller 702 that controls the rotation speed of the rotary drive source of temperature conditioning unit 10*a*, and controller 703 that controls switching units 701*a*, 701*b* and rotation speed controller 702 for controlling the passages of the air flowing through the plurality of ducts or the air volume. This temperature conditioning system of the present exemplary embodiment can thus efficiently temperature-condition a member to be temperature-conditioned while saving energy.

Vehicle 30 of the present exemplary embodiment includes power source 800, drive wheels 801 that are driven by the power supplied from power source 800, driving controller 802 that controls power source 800, and temperature conditioning system 803. In this way, temperature conditioning system 803 can change air that is provided to the member to be temperature-conditioned according to the temperature outside the vehicle. Thus, temperature conditioning system 803 can efficiently temperature-condition the member to be temperature-conditioned while saving energy.

Vehicle 30*a* includes power source 800, drive wheels 801 that are driven by the power supplied from power source 800, driving controller 802 that controls power source 800, and temperature conditioning unit 804. In this way, temperature conditioning unit 804 can change air that is provided to a member to be temperature-conditioned according to the temperature outside the vehicle. Thus, temperature conditioning unit 804 can efficiently temperature-condition the member to be temperature-conditioned while saving energy.

INDUSTRIAL APPLICABILITY

A temperature conditioning unit and a temperature conditioning system of the present invention are susceptible of size reduction, increase in output and increase in efficiency and are useful in, for example, temperature-conditioning a vehicle-mounted battery. When mounted to a vehicle, the temperature conditioning unit and the temperature conditioning system of the present invention can suppress excessive vibration and noise.

REFERENCE MARKS IN THE DRAWINGS

10: temperature conditioning unit
10*a*: temperature conditioning unit
20: temperature conditioning system
20*a*: temperature conditioning system
20*b*: temperature conditioning system
30: vehicle
30*a*: vehicle
100: blower
110: impeller (centrifugal fan)
111: rotor vane
111*a*: inner-peripheral-side end
111*b*: outer-peripheral-side end
112: impeller disk
112*a*: rotating shaft
113: slope
114: shroud
115: diffuser
115*a*: diffuser
116: diffuser plate
117: stator vane
120: fan case
120*g*: projecting wall
121: side wall
122: intake hole
122*a*: intake hole
122*b*: intake hole
123: discharge hole
123*a*: discharge hole
123*b*: discharge hole
124: auxiliary hole 125: exhaust hole
125a: exhaust hole
125b: exhaust hole
α1: absolute outlet angle
α2: absolute outlet angle
200: electric motor
200a: electric motor
200b: electric motor
210: shaft
300: housing
300a: housing-part projection
301: air flow
302: outer surface
310: housing
311: isolation wall
311a: intake-side back-end chamber
311b: exhaust-side chamber
311c: partition
311d: intake-side front-end chamber
320: electronic device part
350: object to be temperature-conditioned
700: duct
700a: duct
700b: duct
700c: duct
700d: duct
700e: duct
700f: duct
701: switching unit
701a: switching unit
701b: switching unit
702: rotation speed controller
703: controller
711a: first temperature conditioning unit
711b: second temperature conditioning unit
720a: first temperature conditioning unit
720b: second temperature conditioning unit
730: first duct
730a: first duct
730b: first duct
730c: second duct
730d: second duct
800: power source
801: drive wheel
802: driving controller
803: temperature conditioning system
804: temperature conditioning unit
1010: temperature conditioning unit
1111: rotor vane
1112: impeller disk
1121: side wall
1121a: inner-circumferential surface
1123: discharge hole
1311: duct

The invention claimed is:

1. A temperature conditioning unit comprising:
an impeller including:
an impeller disk including a rotating shaft in a center of the impeller disk; and
a plurality of rotor vanes erected on an intake-hole-end surface of the impeller disk;
an electric motor including a shaft, the electric motor being connected to the impeller via the shaft;
a fan case including:
a cylindrical side wall formed to be centered about the rotating shaft;
an intake hole that is circular on a plane perpendicular to the rotating shaft, the intake hole being centered about the rotating shaft; and
a discharge hole positioned on an opposite end of the side wall from the intake hole in a direction along the rotating shaft;
a housing accommodating an object to be temperature-conditioned and the fan case, the housing including an air intake hole through which air from outside flows into the housing;
an intake-side back-end chamber adjoining the object to be temperature-conditioned;
an intake-side front-end chamber into which the air flowing through the air intake hole flows in and flows out toward the intake-side back-end chamber; and
an isolation wall separating the intake-side back-end chamber from the intake-side front-end chamber,
wherein the temperature conditioning unit is configured such that the air from the outside flows from the intake-side front-end chamber to the object to be temperature-conditioned via the intake-side back-end chamber, and
the impeller intakes only the air taken from the outside.

2. The temperature conditioning unit according to claim 1, further comprising
an exhaust hole where the air that is drawn into the housing is exhausted out of the housing.

3. The temperature conditioning unit according to claim 1, wherein
the air flows along a first airflow guide shape defined by an inner wall of the fan case and along a second airflow guide shape of the impeller disk that is defined by outer-peripheral-side ends.

4. The temperature conditioning unit according to claim 3, wherein
the first airflow guide shape is a curved surface of the inner wall of the fan case.

5. The temperature conditioning unit according to claim 3, wherein
the second airflow guide shape is a curved side of the impeller disk that is defined by the outer-peripheral-side ends, and
the curved side is curved toward the discharge hole with a convex surface of the curved side being positioned on an intake-hole side of the curved side and a concave surface of the curved side being positioned on a discharge-hole side of the curved side.

6. The temperature conditioning unit according to claim 1, wherein
the impeller further includes a shroud, and
the shroud is an annular plate provided at the intake hole of the fan case and covers respective edges of the plurality of rotor vanes.

7. The temperature conditioning unit according to claim 1, wherein
respective rear edges of the plurality of rotor vanes are positioned along an outer periphery of the impeller disk, and
respective front edges of the plurality of rotor vanes are centered along the rotating shaft and are respectively positioned forwardly of the corresponding rear edges in a rotation direction of the impeller.

8. The temperature conditioning unit according to claim 1, wherein
respective rear edges of the plurality of rotor vanes are positioned along an outer periphery of the impeller disk, respective front edges of the plurality of rotor vanes are centered along the rotating shaft and are respectively positioned forwardly of the corresponding rear edges in a rotation direction of the impeller, and each of the plurality of rotor vanes has a convexly curved surface on a forward side of each of the rotor vanes in the rotation direction of the impeller.

9. The temperature conditioning unit according to claim 3, wherein
a cylindrical wall of the first airflow guide shape that is parallel to a rotating-shaft direction projects into the intake-side back-end chamber.

10. The temperature conditioning unit according to claim 8, wherein
a cylindrical wall of the first airflow guide shape that is parallel to a rotating-shaft direction projects into the intake-side back-end chamber, and
a cylindrical shape of the first airflow guide shape has a hole from which a flow discharged from the impeller is released.

11. The temperature conditioning unit according to claim 1, further comprising
a diffuser disposed between the impeller and the rotary drive source, the diffuser being configured to regulate a flow of centrifugal air discharged from the impeller.

12. The temperature conditioning unit according to claim 1, further comprising
a diffuser disposed between the impeller and the rotary drive source,
wherein
the diffuser includes a diffuser plate that is disk-shaped and is disposed on a plane perpendicular to a rotating shaft of the rotary drive shaft, and a plurality of stator vanes that is erected on an intake-hole-end surface of the diffuser plate and regulates a flow of centrifugal air discharged from the impeller.

13. The temperature conditioning unit according to claim 1, further comprising
a housing-part projection formed by protruding a part of the housing that faces a suction port of a blower.

14. The temperature conditioning unit according to claim 1, wherein
the intake-side back-end chamber is formed of a plurality of spaces.

15. The temperature conditioning unit according to claim 1, wherein
a blower provided to the housing has the discharge hole only where the intake-side back-end chamber faces.

16. The temperature conditioning unit according to claim 15, wherein
a diffuser is disposed only along a part facing the discharge hole.

17. The temperature conditioning unit according to claim 1, wherein
the rotary drive source is an electric motor.

18. The temperature conditioning unit according to claim 1, wherein
the object to be temperature-conditioned is a secondary battery.

19. The temperature conditioning unit according to claim 1, wherein
the object to be temperature-conditioned is a power converter.

20. The temperature conditioning unit according to claim 1, wherein
a stator winding of the rotary drive source includes one of copper, copper alloy, aluminum, and aluminum alloy.

21. The temperature conditioning unit according to claim 1, wherein
the impeller includes one of metal and resin.

22. The temperature conditioning unit according to claim 11, wherein
the diffuser includes one of metal and resin.

23. A temperature conditioning system comprising:
two temperature conditioning units, one of the two temperature conditioning units being the temperature conditioning unit of claim 2 and a first temperature conditioning unit while another of the two temperature conditioning units being the temperature conditioning unit of claim 2 and a second temperature conditioning unit;
a plurality of ducts connecting one of the exhaust hole and the intake hole of the first temperature conditioning unit and one of the intake hole and the exhaust hole of the second temperature conditioning unit;
a switching unit configured to change a connection state among the plurality of ducts;
a rotation speed controller configured to control at least one of rotation speed of a rotary drive source of the first temperature conditioning unit and rotation speed of a rotary drive source of the second temperature conditioning unit; and
a controller configured to control the switching unit and the rotation speed controller to control passages of air flowing through the plurality of ducts or volumes of the air.

24. A temperature conditioning system comprising:
the temperature conditioning unit of claim 2;
a first duct configured to pass air, the first duct being free of mediation of the temperature conditioning unit;
a second duct configured to pass the air that is fed to the temperature conditioning unit or the air that is discharged from the temperature conditioning unit;
a switching unit configured to perform switching between air flows, the switching unit being connected to the first duct and the second duct;
a rotation speed controller configured to control rotation speed of a rotary drive source of the temperature conditioning unit; and
a controller configured to control the switching unit and the rotation speed controller to control passages of the air flowing through the first and second ducts or volumes of the air.

25. A vehicle comprising:
a power source;
a drive wheel that is driven by power supplied from the power source;
a driving controller configured to control the power source; and
the temperature conditioning system of claim 23.

26. A vehicle comprising:
a power source;
a drive wheel that is driven by power supplied from the power source;
a driving controller configured to control the power source; and
the temperature conditioning unit of claim 1.

* * * * *